United States Patent
Channah et al.

(10) Patent No.: US 10,878,249 B2
(45) Date of Patent: Dec. 29, 2020

(54) BORDER INSPECTION WITH AERIAL CAMERAS

(71) Applicant: Accenture Global Solutions Limited, Dublin (IE)

(72) Inventors: Sheheryar Channah, Brussels (BE); Daniel Bachenheimer, Silver Spring, MD (US); Ajay Srinivasan, Bromley (GB)

(73) Assignee: Accenture Global Solutions Limited, Dublin (IE)

( * ) Notice: Subject to any disclaimer, the term of this patent is extended or adjusted under 35 U.S.C. 154(b) by 1002 days.

(21) Appl. No.: 15/007,422

(22) Filed: Jan. 27, 2016

(65) Prior Publication Data
US 2017/0103265 A1   Apr. 13, 2017

Related U.S. Application Data

(63) Continuation-in-part of application No. 14/939,771, filed on Nov. 12, 2015.

(51) Int. Cl.
*G06K 9/00* (2006.01)
*H04N 7/18* (2006.01)
(Continued)

(52) U.S. Cl.
CPC ........ *G06K 9/00771* (2013.01); *B64C 39/024* (2013.01); *B64D 47/08* (2013.01);
(Continued)

(58) Field of Classification Search
CPC ........ G06Q 10/00; G06Q 50/00; G06Q 30/00; B22F 2201/00; G08G 1/096811;
(Continued)

(56) References Cited

U.S. PATENT DOCUMENTS 6,958,676 B1 * 10/2005 Morgan ............... G07B 15/063
340/5.72
7,272,721 B1   9/2007 Hellenthal
(Continued)

FOREIGN PATENT DOCUMENTS

WO   WO 2004/042673   5/2004
WO   WO 2010/034317   4/2010
(Continued)

OTHER PUBLICATIONS

Rio, Automated border control egate and facial recognition (Year: 2016).*
(Continued)

*Primary Examiner* — Sangeeta Bahl
(74) *Attorney, Agent, or Firm* — Fish & Richardson P.C.

(57) ABSTRACT

Methods, systems, and apparatus, including computer programs encoded on computer storage media, for controlling access to physical areas. One of the methods includes receiving, from at least one of one or more sensors, data identifying a vehicle at a border crossing station, determining current weather conditions for the border crossing station, evaluating whether the current weather conditions are favorable to inspection of the vehicle by a mobile camera, determining that the current weather conditions are favorable to inspection of the vehicle by a mobile camera, and in response to the determination that the current weather conditions are favorable to inspection of the vehicle by a mobile camera, providing at least one of one or more mobile cameras with instructions to cause each of the at least one of the mobile cameras to inspect the vehicle.

17 Claims, 8 Drawing Sheets

(51) Int. Cl.
B64C 39/02 (2006.01)
B64D 47/08 (2006.01)
G06Q 10/00 (2012.01)
G08G 1/017 (2006.01)

(52) U.S. Cl.
CPC ......... *G06K 9/00838* (2013.01); *G06Q 10/00* (2013.01); *G08G 1/0175* (2013.01); *H04N 7/181* (2013.01); *B64C 2201/127* (2013.01)

(58) Field of Classification Search
CPC .. G08G 1/205; G08G 1/0175; G06K 9/00771; G06K 9/00832; G06K 9/00838; H04N 7/181; B64C 39/024; B64C 2201/127; B64D 47/08; G07C 9/37
USPC .......................................................... 705/1.1
See application file for complete search history.

(56) References Cited

U.S. PATENT DOCUMENTS

| | | | |
|---|---|---|---|
| 7,336,203 B2* | 2/2008 | Arquette | G08G 1/01 340/907 |
| 7,366,203 B2 | 4/2008 | Deas | |
| 7,676,392 B2 | 3/2010 | Hedley et al. | |
| 8,155,384 B2* | 4/2012 | Chew | G01V 5/0008 382/104 |
| 8,710,955 B2 | 4/2014 | Teti et al. | |
| 8,818,572 B1* | 8/2014 | Tofte | B64C 39/024 701/2 |
| 9,256,794 B2* | 2/2016 | Braithwaite | G06K 9/2018 |
| 9,738,399 B2* | 8/2017 | Lee | B64D 47/08 |
| 9,889,932 B2* | 2/2018 | Sharma | B64C 39/024 |
| 9,996,997 B2 | 6/2018 | Lambert et al. | |
| 2004/0165750 A1 | 8/2004 | Chew | |
| 2004/0167861 A1 | 8/2004 | Hedley | |
| 2005/0055582 A1 | 3/2005 | Bazakos et al. | |
| 2008/0015772 A1 | 1/2008 | Sanma et al. | |
| 2008/0040029 A1* | 2/2008 | Breed | G01S 19/50 701/514 |
| 2008/0136625 A1* | 6/2008 | Chew | G01V 5/0008 340/540 |
| 2008/0147246 A1 | 6/2008 | Cochran | |
| 2008/0175438 A1 | 7/2008 | Alves | |
| 2008/0224823 A1 | 9/2008 | Lawson | |
| 2009/0140887 A1 | 6/2009 | Breed et al. | |
| 2010/0021015 A1 | 1/2010 | Bissett | |
| 2012/0007743 A1* | 1/2012 | Solomon | G01M 3/2807 340/605 |
| 2012/0007749 A1 | 1/2012 | Oldknow et al. | |
| 2014/0032098 A1 | 1/2014 | Anderson | |
| 2014/0070917 A1* | 3/2014 | Protopapas | B60R 25/25 340/3.1 |
| 2015/0163390 A1 | 1/2015 | Lee et al. | |
| 2015/0054639 A1 | 2/2015 | Rosen | |
| 2015/0097824 A1 | 4/2015 | Jinta | |
| 2015/0206403 A1* | 7/2015 | Weinstein | G08B 13/2497 340/531 |
| 2015/0248595 A1 | 9/2015 | Khan et al. | |
| 2016/0024730 A1 | 1/2016 | Richmond et al. | |
| 2016/0203651 A1 | 7/2016 | Heath et al. | |
| 2016/0300414 A1* | 10/2016 | Lambert | G07C 9/00571 |

FOREIGN PATENT DOCUMENTS

| | | | |
|---|---|---|---|
| WO | WO 2010/058058 | 5/2010 | |
| WO | WO-2010058058 A1 * | 5/2010 | ........... G08G 1/0104 |
| WO | WO 2014/080388 | 5/2014 | |

OTHER PUBLICATIONS

Coulter, Automated detection of people and vehicle using airborne remote sensing (Year: 2012).*
European Office Action for Application No. 16192746.2, dated Oct. 9, 2017, 6 pages.
U.S. Office Action for U.S. Appl. No. 14/939,771, dated Nov. 30, 2018, 40 pages.
European Extended Search Report for Application No. 16192746.2, dated Feb. 22, 2017, 5 pages.
'GoSwift' [online]. "Drivers data," [retrieved on Sep. 4, 2015]. Retrieved from the Internet: https://www.evpa.fi/yphis/preReserveCrossersData.action?timeslot=04.09.2015%2012:00, 1 page.
'Swift' [online]. "Borders," [retrieved on Sep. 4, 2015]. Retrieved from the Internet: http://www.goswift.eu/services/borders/, 3 pages.
'Vehicle Occupancy Detection Corporation,' [online]. "Vehicle Occupancy Detection—Video Demonstration," [retrieved on Sep. 4, 2015]. Retrieved from the Internet: http://www.vehicleoccupancydetection.com/, 3 pages.
'Wikipedia' [online]. "Biometric passport," Last modified on Sep. 2, 2015 [retrieved on Sep. 8, 2015]. Retrieved from the Internet: http://en.wikipedia.org/wiki/Biometric_passport, 25 pages.
'Wikipedia' [online]. "ePassport gates," last modified on Aug. 24, 2015 [retrieved on Sep. 4, 2015]. Retrieved from the Internet: https://en.wikipedia.org/wiki/EPassport_gates, 2 pages.
'Wikipedia' [online]. "NEXUS (frequent traveler program)," last modified Aug. 25, 2015 [retrieved on Sep. 4, 2015]. Retrieved from the Internet: https://en.wikipedia.org/wiki/NEXUS_%28frequent_traveler_program%29, 7 pages.
Belgium Search Report and Written Opinion in Application No. 201505635, dated Apr. 14, 2016, 15 pages (with English translation).
U.S. Appl. No. 14/939,771, filed Nov. 12, 2015, Channah et al.
Belgium Search Report for Application No. 201605043, dated Sep. 22, 2016, 19 pages (with English Translation).
Del Rio et al., "Automated border control e-gates and facial, recognition systems," Computers & Security, Sep. 2016, 62:49-72.
Lindstrom, "Using Automatic Identification System Technology to Improve Maritime Border Security," Thesis for the degree of Master of Arts in Security Studies (Homeland Security and Defense), Naval Postgraduate School, Dec. 2014, 86 pages.

* cited by examiner

BORDER INSPECTION WITH AERIAL CAMERAS

CROSS-REFERENCE TO RELATED APPLICATIONS

The present application claims the benefit of Belgium Patent Application No. 2015/5365, filed on Oct. 7, 2015; U.S. patent application Ser. No. 14/939,771, filed on Nov. 12, 2015; and Belgium Patent Application No. 2016/5043, filed on Jan. 20, 2016. The disclosures of the prior applications are considered part of (and are incorporated by reference in) the disclosure of this application.

BACKGROUND

To cross a border, a vehicle and its occupants may be subject to a manual check by a border control officer to determine who is in a vehicle, what the vehicle is transporting, or both. The border control officer may determine whether the people in the vehicle have permission to cross the border.

Drones may be used to navigate to areas that a person might not otherwise be able to access. For instance, a drone may be used to capture image data of a physical area that would be difficult for a person to access on their own.

SUMMARY

In general, one innovative aspect of the subject matter described in this specification can be embodied in methods that include the actions of receiving, from at least one of one or more sensors, data identifying a vehicle at a border crossing station, determining current weather conditions for the border crossing station, evaluating whether the current weather conditions are favorable to inspection of the vehicle by a mobile camera, determining that the current weather conditions are favorable to inspection of the vehicle by a mobile camera, and in response to the determination that the current weather conditions are favorable to inspection of the vehicle by a mobile camera, providing at least one of one or more mobile cameras with instructions to cause each of the at least one of the mobile cameras to inspect the vehicle. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of receiving, from one or more sensors, data identifying a vehicle at a border crossing station, determining a current volume of traffic at the border crossing station using at least the data identifying the vehicle at the border crossing station and in response to receiving the data identifying the vehicle at the border crossing station, determining whether the current volume of traffic at the border crossing station satisfies a threshold volume, and in response to a determination that the current volume of traffic at the border crossing station satisfies a threshold volume, providing two or more mobile cameras with instructions to cause the two or more mobile cameras to inspect the vehicle, or in response to a determination that the current volume of traffic at the border crossing station does not satisfy a threshold volume, providing only a particular mobile camera with instructions to cause the particular mobile camera to inspect the vehicle. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of receiving, from one or more sensors, data identifying a vehicle at a border crossing station, the vehicle including one or more passengers, determining a current threat level at the border crossing station in response to receiving the data identifying the vehicle at the border crossing station, determining whether the current threat level at the border crossing station satisfies a threshold threat level, and in response to a determination that the current threat level at the border crossing station satisfies a threshold threat level, providing two or more mobile cameras with instructions to cause the two or more mobile cameras to inspect the vehicle, or in response to a determination that the current threat level at the border crossing station does not satisfy a threshold threat level, providing only a particular mobile camera with instructions to cause the particular mobile camera to inspect the vehicle. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of receiving first data identifying a vehicle and one or more passengers for the vehicle that are requesting to cross a particular border, determining, using the first data identifying the passengers, whether each of the passengers for the vehicle is authorized to cross the particular border in response to receiving the first data, in response to determining whether each of the passengers for the vehicle is authorized to cross the particular border, storing second data in a data set of pre-registered border crossers that identifies the vehicle, each of the passengers, and whether each of the passengers is authorized to cross the particular border, receiving, from one or more first sensors, third data identifying the vehicle and indicating entry of the vehicle into a border crossing station that provides access to the particular border, in response to receiving the third data, comparing the third data identifying the vehicle with data from the data set of pre-registered border crossers, determining that the third data and the second data both identify the vehicle in response to comparing the third data identifying the vehicle with data from the data set of pre-registered border crossers, in response to determining that the third data and the second data both identify the vehicle, collecting, from one or more second sensors and for each of one or more current passengers in the vehicle, fourth data representing the current passenger, determining whether the current passengers in the vehicle and the passengers identified in the second data are the same people by comparing the fourth data to the second data in the data set of pre-registered border crossers, and providing instructions to guide the vehicle to a lane at the border crossing station in response to determining whether the current passengers in the vehicle and the passengers identified in the second data are the same people and using the second data that identifies whether each of the passengers is authorized to cross the particular border. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, one innovative aspect of the subject matter described in this specification can be embodied in methods that include the actions of receiving, for each of three or more vehicles, first data identifying the vehicle, one or more passengers for the vehicle that are requesting to cross a particular border, determining, for each of the three or more vehicles and using the first data identifying the passengers, whether each of the passengers for the vehicle is authorized to cross the particular border in response to receiving the first data, in response to determining whether each of the passengers for the vehicle is authorized to cross the particular border, storing, for each of the three or more vehicles, a set of second data in a data set of pre-registered border crossers that identifies the vehicle, each of the passengers, and whether each of the passengers is authorized to cross the particular border, receiving, for each of the three or more vehicles and from one or more first sensors, third data identifying the vehicle and indicating entry of the vehicle into a border crossing station that provides access to the particular border, in response to receiving the third data, comparing the third data identifying the vehicle with data from the data set of pre-registered border crossers to determine whether a set of data in the data set of pre-registered border crossers is for the same vehicle, for at least one first vehicle from the three or more vehicles: determining that the third data and a first set of data in the data set of pre-registered border crossers both identify the first vehicle in response to comparing the third data identifying the first vehicle with data from the data set of pre-registered border crossers, in response to determining that the third data and the first set of data in the data set of pre-registered border crossers both identify the vehicle, collecting, from one or more second sensors and for each current passengers in the first vehicle, fourth data representing the current passenger, determining that the current passengers in the first vehicle and the passengers identified in the first set of data are the same people by comparing the fourth data to the first set of data in the data set of pre-registered border crossers, providing instructions to guide the first vehicle to a first lane at the border crossing station in response to determining that the current passengers in the first vehicle and the passengers identified in the first set of data are the same people and using the first set of data that identifies whether each of the passengers is authorized to cross the particular border, detecting the first vehicle in the first lane, and automatically opening a gate for the first lane to allow movement of the first vehicle through the gate without requiring manual inspection of the first vehicle or the current passengers in the first vehicle in response to detecting the first vehicle in the first lane, for at least one second vehicle from the three or more vehicles: determining that the third data and a second set of data in the data set of pre-registered border crossers both identify the second vehicle in response to comparing the third data identifying the second vehicle with data from the data set of pre-registered border crossers, in response to determining that the third data and the second set of data in the data set of pre-registered border crossers both identify the vehicle, collecting, by the second sensors and for each passenger in a subset of current passengers in the second vehicle, fifth data representing the current passenger, determining that the subset of the current passengers in the second vehicle and a first subset of the passengers identified in the second set of data are the same people by comparing the fifth data to the second set of data in the data set of pre-registered border crossers, and providing instructions to guide the second vehicle to a second lane at the border crossing station in response to determining that the subset of the current passengers in the second vehicle and the first subset of the passengers identified in the first data are the same people and using the second set of data that identifies whether each of the passengers is authorized to cross the particular border, determining a second subset of the passengers identified in the second set of data for the second vehicle, the second subset of the passengers disjoint from the first subset of the passengers, and providing instructions for presentation of a user interface identifying each passenger in the second subset of the passengers and the second vehicle and indicating that an identity of each of the passengers in the second subset of the passengers should be verified, and for at least one third vehicle from the three or more vehicles: providing instructions to guide the third vehicle to a third lane at the border crossing station at which a guard manually inspects the third vehicle and current passengers in the third vehicle in response to detecting the entry of the third vehicle into the border crossing station that provides access to the particular border and determining that a) some of the passengers for the third vehicle might not be authorized to cross the particular border, b) some of the passengers for the third vehicle are not allowed automated crossing over the particular border, c) the third vehicle is not allowed automated crossing over the particular border, or d) the data set of pre-registered border crossers does not include any data for the third vehicle, and providing instructions for presentation of a user interface identifying the third vehicle using the third data. Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. Evaluating whether the current weather conditions are favorable to inspection of the vehicle by a mobile camera may include evaluating whether wind conditions at the border crossing station are favorable to inspection of the vehicle by a mobile camera. Providing at least one of the mobile cameras with instructions to cause each of the at least one of the mobile cameras to inspect the vehicle may occur in response to a determination that the wind conditions at the border crossing station are favorable to inspection of the vehicle by a mobile camera. Evaluating whether the current weather conditions are favorable to inspection of the vehicle by a mobile camera may include evaluating whether a distance between the sun and a horizon as measured at the border crossing station satisfies a threshold distance. Providing at least one of the mobile cameras with instructions to cause each of the at least one of the mobile cameras to inspect the vehicle may occur in response to a determination that the distance between the sun and the horizon as measured at the border crossing station satisfies the threshold distance.

In some implementations, the method may include determining, using the data identifying the vehicle at the border crossing station, that the data is insufficient to enable identification of one or more passengers of the vehicle, and in response to determining that the data is insufficient to enable identification of one or more passengers of the vehicle, determining that one of the mobile cameras should inspect the vehicle. The one or more sensors comprise one or more fixed cameras. Determining that the data is insufficient to enable identification of one or more passengers of the vehicle may include determining that image data received from the one or more fixed cameras is insufficient to enable identification of one or more passengers of the vehicle.

In some implementations, the method may include determining a lane at the border crossing station in which the vehicle will access the border crossing station, determining a particular mobile camera assigned to the lane at the border crossing station in which the vehicle will access the border crossing station, determining a battery level for the particular mobile camera, and determining whether the battery level for the particular mobile camera satisfies a threshold battery level. Providing the at least one of the mobile cameras with instructions to cause each of the at least one of the mobile cameras to inspect the vehicle may occur in response to a determination that the battery level for the particular mobile camera satisfies the threshold battery level. A system may include a vehicle inspection notification system. The method may include, in response to a determination that the current weather conditions are not favorable to inspection of the vehicle by a mobile camera, providing the vehicle inspection notification system with instructions to cause a presentation of a user interface that indicates that inspection of the vehicle by a mobile camera is not possible. The vehicle inspection notification system may be a mobile device. Providing the vehicle inspection notification system with instructions to cause the presentation of the user interface that indicates that inspection of the vehicle by a mobile camera is not possible may include providing the mobile device with instructions to cause a presentation of a user interface that includes an identifier for the vehicle and indicates that inspection of the vehicle by a mobile camera is not possible. Providing the mobile device with instructions to cause the presentation of the user interface that includes the identifier for the vehicle and indicates that inspection of the vehicle by a mobile camera is not possible may include providing the mobile device with instructions to cause a presentation of a user interface that includes a lane identifier for a lane in which the vehicle will access the border crossing station.

In some implementations, the method may include determining updated current weather conditions for the border crossing station after providing the at least one of the mobile cameras with instructions to cause each of the at least one of the mobile cameras to inspect the vehicle, determining that the updated current weather conditions for the border crossing station are not favorable to inspection of the vehicle by a mobile camera, and in response to a determination that the updated current weather conditions for the border crossing station are not favorable to inspection of the vehicle by a mobile camera, providing each of the at least one of the mobile cameras with instructions to cause the respective mobile camera to return to a docking station. Determining the current weather conditions for the border crossing station may include determining the current weather conditions for the border crossing station at a time relevant to the vehicle being located at the border crossing station. Determining the current weather conditions for the border crossing station may include determining the current weather conditions for the border crossing station in response to receiving the data identifying the vehicle at the border crossing station.

In some implementations, providing the at least one of the mobile cameras with instructions to cause each of the at least one of the mobile cameras to inspect the vehicle may include providing each of the at least one of the mobile cameras with an identification of a feature of the border crossing station for the mobile camera to use to determine a path along which to move to inspect the vehicle. Providing each of the at least one of the mobile cameras with an identification of a feature of the border crossing station for the mobile camera to use to determine a path along which to move to inspect the vehicle may include providing one or more of the mobile cameras with an identification of markings for a particular barrier at the border crossing station that the respective mobile camera should use to determine the path along which to move to inspect the vehicle. Providing each of the at least one of the mobile cameras with an identification of a feature of the border crossing station for the mobile camera to use to determine a path along which to move to inspect the vehicle may include providing one or more of the mobile cameras with an identification of markings for a particular lane at the border crossing station that the respective mobile camera should use to determine the path along which to move to inspect the vehicle. Providing each of the at least one of the mobile cameras with the identification of markings for the particular lane at the border crossing station that the respective mobile camera should use to determine the path along which to move to inspect the vehicle may include providing one of the mobile cameras with an identification of a color of the markings for the particular lane at the border crossing station that the respective mobile camera should use to determine the path along which to move to inspect the vehicle.

In some implementations, providing the at least one of the mobile cameras with instructions to cause each of the at least one of the mobile cameras to inspect the vehicle may include determining a current volume of traffic at the border crossing station, determining whether the current volume of traffic at the border crossing station satisfies a threshold volume, determining a quantity of the mobile cameras to provide instructions to using the determination whether the current volume of traffic at the border crossing station satisfies the threshold volume, and providing the determined quantity of the mobile cameras with instructions to cause each of the determined quantity of the mobile cameras to inspect the vehicle. Providing the at least one of the mobile cameras with instructions to cause each of the at least one of the mobile cameras to inspect the vehicle may include determining a current threat level at the border crossing station, determining whether the current threat level at the border crossing station satisfies a threshold threat level, determining a quantity of the mobile cameras to provide instructions to using the determination whether the current threat level at the border crossing station satisfies the threshold threat level, and providing the determined quantity of the mobile cameras with instructions to cause each of the determined quantity of the mobile cameras to inspect the vehicle.

In some implementations, receiving the first data identifying the vehicle and the passengers for the vehicle that are requesting to cross the particular border may include receiving the first data from a device at a location physically remote from the border crossing station. Determining, using the first data identifying the passengers, whether each of the passengers for the vehicle is authorized to cross the particular border in response to receiving the first data may include determining, using the first data identifying the passengers, whether each of the passengers for the vehicle is authorized to cross the particular border while the vehicle moves from the location to the border crossing station. Determining, using the first data identifying the passengers, whether each of the passengers for the vehicle is authorized to cross the particular border in response to receiving the first data may include determining, using the first data identifying the passengers, whether each of the passengers for the vehicle is authorized to cross the particular border before the vehicle arrives at the border crossing station.

In some implementations, receiving the first data identifying the vehicle and the passengers for the vehicle that are requesting to cross the particular border may include receiving a vehicle license plate number, and one or more of: biometric data for at least some of the passengers, passport data for at least some of the passengers, or visa data for at least some of the passengers. Receiving the first data identifying the vehicle and the passengers for the vehicle that are requesting to cross the particular border may include receiving a name for the particular border. Receiving, from one or more first sensors, the third data indicating the entry of the vehicle into the border crossing station that provides access to the particular border may include receiving, from a camera at the border crossing station, data representing an image of a particular vehicle, and determining, using the data representing the image of the vehicle, an identifier for the particular vehicle. Comparing the third data identifying the vehicle with data from the data set of pre-registered border crossers may include comparing the identifier for the particular vehicle with the second data identifying the vehicle to determine whether the particular vehicle and the vehicle are the same vehicle. Determining that the third data and the second data both identify the vehicle may include determining that the vehicle has entered the border crossing station in response to determining that the particular vehicle and the vehicle are the same vehicle. Determining the identifier for the particular vehicle may include determining a license plate number for the particular vehicle.

In some implementations, receiving, from one or more second sensors and for each of the current passengers in the vehicle, the fourth data representing the current passenger may include receiving, from one or more cameras and for each of the current passengers, image data representing a face of the passenger. Receiving, from one or more cameras and for each of the current passengers, the image data representing the face of the passenger may include receiving, for at least one of the current passengers, infrared image data. Receiving, from one or more cameras and for each of the current passengers, the image data representing the face of the passenger may include receiving, for at least one of the current passengers, visible light image data. Receiving, from one or more second sensors and for each of the current passengers in the vehicle, the fourth data representing the current passenger may include in response to determining that the third data and the second data both identify the vehicle, sending a message to the second sensors requesting capture of the fourth data for each of the current passengers, and in response to sending a message to the second sensors requesting capture of the fourth data for each of the current passengers, receiving, from the second sensors and for each of the current passengers in the vehicle, the fourth data representing the current passenger.

In some implementations, determining whether the current passengers in the vehicle and the passengers identified in the second data are the same people by comparing the fourth data to the second data in the data set of pre-registered border crossers may include determining that at least some of the current passengers in the vehicle and the passengers identified in the second data are the same people and are authorized to cross the particular border. Determining whether the current passengers in the vehicle and the passengers identified in the second data are the same people by comparing the fourth data to the second data in the data set of pre-registered border crossers may include determining that at least some of the current passengers in the vehicle and the passengers identified in the second data are the same people and are not authorized to cross the particular border. Determining whether the current passengers in the vehicle and the passengers identified in the second data are the same people by comparing the fourth data to the second data in the data set of pre-registered border crossers may include determining that at least some of the current passengers in the vehicle and the passengers identified in the second data are not the same people, and determining, for each of the at least some of the current passengers in the vehicle, an identify of the current passenger by accessing a database of people using the fourth data for the current passenger.

In some implementations, determining whether the current passengers in the vehicle and the passengers identified in the second data are the same people may include comparing, for each of the current passengers, the fourth data for the current passenger with the second data identifying the passengers for the vehicle, determining, for each of the current passengers, whether the fourth data for the current passenger matches data for one of the passengers from the second data in response to comparing the fourth data for the current passenger with the second data identifying the passengers for the vehicle, and determining that each of the current passengers is one of the passengers for the vehicle and that no additional or fewer people are in the vehicle in response to determining, for each of the current passengers, that the fourth data for the current passenger matches data for one of the passengers from the second data. Determining that each of the current passengers is one of the passengers for the vehicle and that no additional or fewer people are in the vehicle may include receiving data from one or more sensors that indicates that no additional people are currently in the vehicle. Receiving the data from the one or more sensors that indicates that no additional people are currently in the vehicle may include receiving data from one or more cameras. Receiving the data from the one or more sensors that indicates that no additional people are currently in the vehicle may include receiving data from one or more heat sensors.

In some implementations, determining, using the first data identifying the passengers, whether each of the passengers for the vehicle is authorized to cross the particular border may include determining whether each of the passengers has a visa to enter an area adjacent to the particular border to which the border crossing station provides access. Determining, using the first data identifying the passengers, whether each of the passengers for the vehicle is authorized to cross the particular border may include determining whether any of the passengers are on a watch list that indicates persons of interest, and providing the instructions to guide the vehicle to the lane at the border crossing station comprises providing the instructions to guide the vehicle to the lane at the border crossing station in response to determining that none of the passengers are on the watch list that indicates persons of interest.

In some implementations, the method may include determining a type of the vehicle, and selecting the lane using the type of the vehicle, wherein providing the instructions to guide the vehicle to the lane at the border crossing station comprises providing the instructions to guide the vehicle to the lane at the border crossing station in response to selecting the lane using the type of the vehicle. Providing the instructions to guide the vehicle to the lane at the border crossing station may include providing the instructions to an automated display to cause the automated display to present information to guide the vehicle to the lane at the border crossing station. The method may include determining that a predetermined amount of time has passed since storing the second data in the data set of pre-registered border crossers, and removing the second data from the data set of pre-registered border crossers. Receiving the first data identifying the vehicle and the passengers for the vehicle that are requesting to cross the particular border may include receiving the first data identifying the vehicle and passengers for the vehicle that are requesting to cross the particular border.

In some implementations, a system may include a computer terminal that includes a second data processing apparatus, and a second non-transitory computer readable storage medium in data communication with the second data processing apparatus and storing instructions executable by the second data processing apparatus and upon such execution cause the second data processing apparatus to perform operations, e.g., a method, that include receiving, for at least one of the three or more vehicles, an identifier of the vehicle and data identifying the passengers of the vehicle, and sending, to the data processing apparatus, the first data including the identifier of the vehicle and the data identifying the passengers of the vehicle. The system may include a camera to capture image data representing an image of one of the three or more vehicles and send the image data to the data processing apparatus. Receiving, for each of the three or more vehicles and from one or more first sensors, third data identifying the vehicle and indicating entry of the vehicle into the border crossing station that provides access to the particular border may include receiving, for the one of the three or more vehicles, the image data representing the image of the vehicle from the camera. The method may include analyzing the image data to identify the vehicle shown in the image. The system may include a vehicle detector to detect movement of a vehicle, and cause the camera to store image data representing an image of the vehicle in response to detecting movement of the vehicle.

In some implementations, a method may include determining, for each of the three or more vehicles, a type of the vehicle, and determining navigation instructions for the vehicle at the border crossing station using the type of the vehicle. Determining the type of the vehicle may include determining a size of the vehicle, a type of content typically transported by the vehicle, or a transparency of a window in the vehicle. Determining navigation instructions for the vehicle at the border crossing station using the type of the vehicle may include, in response to determining that the vehicle is a passenger van, providing instructions for presentation of directions to cause the passenger van to move past an aerial camera to allow the aerial camera to capture image data for some of the current passengers in the passenger van. Determining navigation instructions for the vehicle at the border crossing station using the type of the vehicle may include, in response to determining that the vehicle is a car, providing instructions for presentation of directions to cause the car to move past a stationary camera to allow the stationary camera to capture image data for some of the current passengers in the car. Determining navigation instructions for the vehicle at the border crossing station using the type of the vehicle may include, in response to determining that the vehicle has one or more windows that are not transparent, providing instructions for presentation of directions to cause the vehicle to move to the third lane at the border crossing station at which a guard manually inspects the vehicle and the passengers in the vehicle.

In some implementations, a system may include a data set of pre-registered border crossers that includes records that each identify a vehicle and passengers for the vehicle, and indicate whether each of the passengers is authorized to cross a corresponding border. The system may include a controller that operates the gate for the first lane. Automatically opening the gate for the first lane to allow passage of the vehicle through the gate without requiring manual inspection of the vehicle or the passengers may include sending, by the data processing apparatus to the controller, instructions to cause the controller to open the gate to allow only the corresponding first vehicle to pass through the gate and close the gate once the corresponding first vehicle has passed through the gate. Providing the instructions to guide the vehicle to the second lane at the border crossing station may include providing instructions to guide the second vehicle to a particular lane at the border crossing station. Providing the instructions to guide the vehicle to a third lane at the border crossing station at which a guard manually inspects the vehicle and the passengers may include providing instructions to guide the third vehicle to the particular lane at the border crossing station. The method may include determining that a specific passenger in a particular vehicle from the three or more vehicles is not eligible for automated entry to the particular border, and providing instructions to guide the particular vehicle to the third lane at the border crossing station.

The subject matter described in this specification can be implemented in particular embodiments and may result in one or more of the following advantages. In some implementations, an automated border inspection system may more accurately identify travelers; automate vehicle classification, identification, or both; enhance an ability to identify and respond to high risk travelers; or a combination of two or more of these, compared to other systems. In some implementations, the automated border inspection system may ensure that all of the same databases are searched when determining, for each passenger who pre-registers to cross a border, whether the passenger, and the vehicle in which they are travelling, is authorized to cross the border. In some implementations, an automated border inspection system may ensure that the same checks and analysis are perform for all passengers, vehicles, or both. In some implementations, an automated border inspection system may maintain a log that associates registration information with biometric data of passengers who entered a border crossing for later use, e.g., validation. In some implementations, an automated border inspection system with infrared detectors may more accurately determine vehicle occupancy or facilitate a vehicle occupancy determination compared to other systems. In some implementations, an automated border inspection system may more efficiently use resources, e.g., physical space, budget, personnel, or a combination of two or more of these, compared to other systems. In some implementations, an automated border inspection system may automate border crossings to expedite travel or trade, or both, that are both authorized and pre-registered. In some implementations, an automated border inspection system may reduce or eliminate the wait time for a particular vehicle, and the passengers in the particular vehicle, at a particular border crossing.

In some implementations, a border inspection system that uses mobile cameras, e.g., aerial cameras, may decrease the amount of time necessary to capture data for people, vehicles, or both, at a border crossing station. In some implementations, a border inspection system with mobile cameras may increase throughput at a border crossing station, reduce the likelihood of error when analyzing people, vehicles, or both, at a border crossing station, or a combination of these. In some implementations, a border crossing station that uses both fixed cameras and mobile cameras may capture different types of data at a border crossing station, e.g., close up images, images from further away, audio content for a vehicle, infrared images, images at different angles, or a combination of two or more of these. In some implementations, a border crossing station that uses both fixed cameras and mobile cameras may enable remote command and control of one or more vehicle lanes. In some implementations, a border crossing station that uses both fixed cameras and mobile cameras may enable the ability to record and audit officer/traveler interaction in vehicle lanes.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
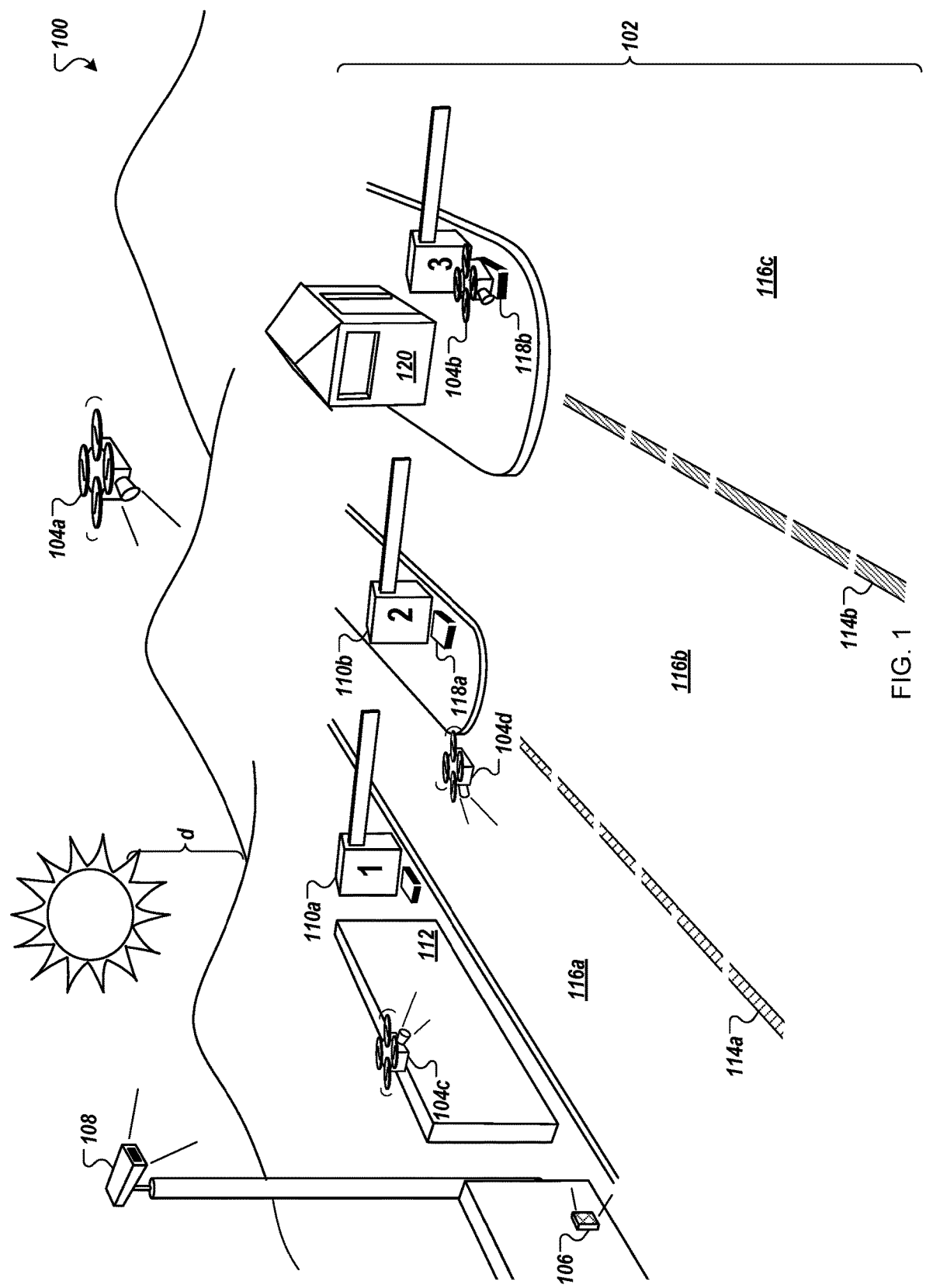
FIG. 1 shows an example of an environment that includes a border crossing station with multiple aerial cameras.

In some implementations, an automated border inspection system may use fixed cameras, aerial cameras, e.g., drones, or both to capture image data of a vehicle's passengers to verify the identity of the passengers, the vehicle's license plate, e.g., to reference corresponding motor vehicle registration data, the vehicle itself, e.g., to determine type, color, year, make, or model of the vehicle, or a combination of two or more of these. For instance, the automated border inspection system may receive image data from a fixed camera for a vehicle at a border crossing station, determine that the vehicle includes multiple passengers, e.g., a driver and one additional passenger, determine that the image data for the driver can be used to determine an identifier for the driver, and that additional image data is required to determine an identifier for the additional passenger.

The automated border inspection system may send instructions to one or more aerial cameras instructing the aerial cameras to capture additional image data of the vehicle, some of the passengers in the vehicle, or both. Upon receipt of the additional image data from the aerial cameras, the automated border inspection system analyzes the image data to determine whether or not to allow the vehicle to cross a border using an automated process, e.g., without requiring manual inspection of the vehicle. For instance, the automated border inspection system may determine whether each of the passengers in the vehicle is on a list of approved border crossers and, if so, allow the vehicle to cross at the border crossing station using an automated process. If one of the passengers in the vehicle is not on a list of approved border crossers, the automated border inspection system may send a message to a device indicating that the vehicle is not approved for an automatic border crossing process, and may prevent the vehicle from participating in an automated border crossing process.

The automated border inspection system may determine properties of a border control station and use the properties to determine whether to send an aerial camera to inspect a vehicle. For instance, the automated border inspection system may determine a wind speed, e.g., a wind gust speed or an average wind speed, an amount of light at the border control station, or both. When the wind speed is above a threshold speed, the automated border inspection system determines that an aerial camera should not inspect a vehicle. When there is a low amount of light at the border control station, when light at the border control station causes wash out, e.g., and it would be difficult for a camera to capture good quality image data of a passenger, or both, the automated border inspection system may determine that an aerial camera should not inspect a vehicle. In some examples, when it is dark out, one or more aerial cameras may use infrared cameras. One or more of the aerial cameras may use visible light cameras when it is not dark out.

Other properties of the border control station may include an amount of vehicle traffic at the border control station, a battery level of an aerial camera, a threat level of the border crossing station, or two or more of these. When the amount of vehicle traffic at the border crossing station satisfies a threshold volume, e.g., is high, the threat level of the border crossing station satisfies a threshold threat level, e.g., is high, or both, the automated border inspection system may cause more aerial cameras to inspect vehicles than otherwise, e.g., if one or both of the thresholds were not satisfied.

FIG. 1 shows an example of an environment 100 that includes a border crossing station 102 with multiple aerial cameras 104a-d. For example, a motion sensor 106 may detect a presence of a vehicle at the border crossing station 102 and send a signal to a border inspection system, e.g., for the border crossing station 102, that indicates the presence of the vehicle. The border inspection system, e.g., an automated border inspection system, may activate a fixed camera 108 to capture image data of the vehicle and receive the image data from the fixed camera 108.

The automated border inspection system analyzes the image data to determine whether the image data can be used to determine an identifier for each of the passengers in the vehicle, the vehicle's license plate, the vehicle itself, or a combination of two or more of these. For instance, the automated border inspection system determines whether the image data includes data to identify the vehicle, e.g., image data of a registration plate for the vehicle, and image data for each face of each passenger in the vehicle. In some examples, the image data is data from a single picture. In some examples, the image data is from multiple pictures, e.g., from the fixed camera 108 or multiple fixed cameras.

When the automated border inspection system determines that the image data includes data to identify the vehicle and each of the passengers in the vehicle, the automated border inspection system determines whether the vehicle and the passengers are on lists approved for automated crossing at the border crossing station 102. For instance, the automated border inspection system determines whether the vehicle is identified on a list of approved vehicles for participation in an automated border crossing process at the border crossing station 102. The automated border inspection system determines whether each of the passengers is identified on a list of approved passengers for participation in an automated border crossing process at the border crossing station. Some examples of processes used to determine whether a vehicle, a passenger, or both, are identified on an approved list for participation in an automated border crossing process are described in more detail below.

When the automated border inspection system determines that both the vehicle and the passengers in the vehicle are on approved lists for participation in an automated border crossing process, the automated border inspection system provides instructions to guide the vehicle to a lane, e.g., a first lane 116a. When the automated border inspection system determines that the vehicle is in the lane and moving up to a gate, e.g., a first gate 110a, the automated border inspection system sends instructions to the gate to cause the gate to open and allow the vehicle to proceed through the border crossing station as part of an automated process, e.g., without manual inspection of the vehicle or the passengers in the vehicle.

If the automated border inspection system determines that the image data does not include data to determine an identifier for the vehicle, one of the passengers, or both, the automated border inspection system determines whether to instruct one or more of the aerial cameras 104a-d to inspect the vehicle. For instance, the automated border inspection system may determine weather conditions for the border crossing station, a battery level of one of the aerial cameras 104a-d, a threat level and a type of threat, or two or more of these.

The automated border inspection system determines whether a distance d between the sun and a horizon satisfies a threshold distance, e.g., is greater than the threshold distance. The horizon may be a horizon at the border crossing station 102, e.g., an eastern horizon in the morning and a western horizon in the afternoon. The horizon may be an estimated horizon, e.g., if there were not hills or mountains on the horizon.

When the automated border inspection system determines that the distance d between the sun and the horizon satisfies the threshold distance, the automated border inspection system may determine that images captured by the aerial cameras 104a-d should be good quality, accurately represent the content depicted in the images, e.g., the vehicle or passengers of a vehicle, can be used to analyze the content depicted in the images, or a combination of two or more of these, and that at least one of the aerial cameras 104a-d should be instructed to capture image data of the vehicle, passengers in the vehicle, or both. For instance, the automated border inspection system may determine whether the distance d, or an absolute value of the distance d, is greater than the threshold distance and satisfies the threshold distance. The automated border inspection system may determine the distance d between the sun and the horizon closest to the sun.

In some implementations, the automated border inspection system may determine which sensors to use and at what positions, e.g., for the determination of the distance d between the sun and the horizon. For instance, the automated border inspection system may use a time of day, time of year, day of week, season, month, or combination of two or more of these to determine which sensors to use and at what positions.

The automated border inspection system may determine that the sun is approximately directly above the border crossing station 102, or that the distance d otherwise satisfies the threshold distance, and sends instructions to one of the aerial camera 104a-d to inspect a vehicle. For example, the automated border inspection system may instruct the aerial camera A 104a to capture an image of the vehicle.

The automated border inspection system may instruct the aerial camera A 104a to capture an image of a particular portion of feature of the vehicle, such as the registration number plate of the vehicle, e.g., the license plate. In some examples, the automated border inspection system may instruct the aerial camera A 104a to capture image data of a passenger located in a particular seat of the vehicle. For instance, the automated border inspection system may use image data from the fixed camera 108 to determine that a probability that a passenger is located in a front passenger seat of a vehicle satisfies a threshold probability and, in response, send instructions to the aerial camera A 104a instructing the aerials camera A 104a to capture image data of a passenger located in the front passenger seat of the vehicle.

The automated border inspection system may use a time of day, weather conditions, the distance d between the sun and the horizon, or a combination of these, to determine settings for the aerial cameras 104a-d. For instance, when the sun is above the horizon at the border crossing station 102, the automated border inspection system may instruct an aerial camera to capture images using the visible light spectrum. When the sun is below the horizon or it is cloudy at the border crossing station 102, the automated border inspection system may instruct an aerial camera to capture infrared image data, e.g., of passengers in a vehicle. In some examples, when the sun is above the horizon at the border crossing station 102 and it is cloudy out, the automated border inspection system may determine an amount of ambient light at the border crossing station 102 and use the amount of ambient light to determine whether an aerial camera should inspect the vehicle and settings for the aerial camera, e.g., as the position of the sun might not cause wash out in images captured by the aerial camera because of the clouds.

In some examples, the automated border inspection system may determine that the distance d between the sun and the horizon at the border crossing station 102 does not satisfy a threshold value, e.g., is less than or equal to the threshold value, and that aerial cameras should not inspect a vehicle. For instance, when the distance d is less than the threshold distance, a likelihood that image data captured by an aerial camera will not be usable by the automated border inspection system may be high, e.g., because the image data will be washed out or otherwise difficult for the automated border inspection system to use to determine information about a passenger or a vehicle depicted in the image.

When the automated border inspection system determines that the sun is below the horizon, by at least a second threshold amount, the automated border inspection system may instruct an aerial camera to capture image data of a vehicle. For example, the automated border inspection system may instruct aerial cameras to capture image data of vehicles throughout the day except for a period of time around sunrise and sunset. The automated border inspection system may determine the periods of time based on the time of year, the distance between the sun and the horizon at the border crossing station 102, or both.

The automated border inspection system may instruct an aerial camera, or an aerial camera may use, a different type of camera depending on the amount of light at the border crossing station 102. For example, in low light situations, e.g., at night or when it is cloudy at the border crossing station 102, an aerial camera may use an infrared camera to capture image data.

In some examples, the automated border inspection system may determine a battery level of one of the aerial cameras 104a-d and use the battery level to determine whether to instruct an aerial camera to capture image data of a vehicle. For instance, when the battery level of the aerial camera A 104a satisfies a threshold battery level the automated border inspection system instructs the aerial camera A 104a to inspect a vehicle. When the battery level of the aerial camera A 104a is below the threshold battery level, e.g., is low, the automated border inspection system determines whether another aerial camera 104b-d at the border crossing station 102 can inspect the vehicle, e.g., has a battery level that satisfies the threshold battery level, or whether the vehicle cannot be inspected by an aerial camera, e.g., and should be inspected manually. In some examples, an automated border inspection system may include a variable message sign, or multiple signs, which direct a vehicle to an appropriate lane, e.g., based on automated inspection via a camera or manual inspection.

For example, each of the aerial cameras 104a-d may be assigned to a particular lane at the border crossing station and analyze vehicles in that particular lane. When the automated border inspection system determines that a vehicle, for which the vehicle or a passenger in the vehicle need further inspection, is in a particular lane, the automated border inspection system determines the aerial camera assigned to that lane and instructs that aerial camera to inspect the lane, e.g., when the aerial camera assigned to that lane has sufficient battery power. When the battery level for the determined camera satisfies the threshold value, the automated border inspection system sends instructions to the determined camera to cause the camera to inspect the vehicle. When the battery level for the determined camera does not satisfy the threshold value, the automated border inspection system determines whether another camera at the border crossing station 102 is available to inspect the vehicle.

The aerial camera may use barriers 112 or lane markings 114a-b for the lane to determine a path to the vehicle so that the aerial camera may capture image data of the vehicle. For instance, the aerial camera C 104c may use the barriers 112 adjacent to a first lane 116a to determine a path to navigate to capture data of a vehicle in the first lane 116a.

The path may be a path that is not along an expected path of the vehicle. For example, the path may be adjacent to, above, or both, the barrier 112. In some examples, the path may be above the lane markings 114a-b, e.g., when vehicles are not expected to change lanes at the border crossing station 102 or in an area close to the gates 110a-c.

The barriers 112, the lane markings 114a-b, or both, may include features used by the aerial cameras 104a-d that distinguish the barriers 112, the lane markings 114a-b, or both, from other barriers 112 and lane markings 114a-b. For instance, the lane markings A 114a may be a different color than the lane markings B 114b. In some examples, the aerial cameras 104a-d may use signals, e.g., wireless signals, transmitted by the barriers 112, the lane markings 114a-b, or both, to determine a path through the border crossing station.

In some implementations, the automated border inspection system may instruct two or more aerial cameras to inspect a vehicle. For instance, the automated border inspection system may determine that a vehicle has passengers on each side of the vehicle for which the automated border inspection system does not have data to determine an identifier for the passengers, that the vehicle is large and requires additional analysis, e.g., based on the type of vehicle, or that the vehicle otherwise requires analysis by two or more of the aerial cameras 104a-d. The automated border inspection system may instruct the aerial camera C 104c to capture image data of a driver's side of the vehicle, e.g., by following a path determined using the barrier 112, and the aerial camera D 104d to capture image data of a passenger's side of the vehicle, e.g., by following a path determined using the markings 114a.

When the aerial cameras 104a-d are not in the process of analyzing a vehicle, e.g., capturing image data of the vehicle or passengers of the vehicle or moving to or from the vehicle, each of the aerial cameras 104a-d may connect to a respective charging station 118a-b. The connection between each of the aerial cameras 104a-d and the respective charging stations can be a physical connection or an inductive connection. For example, the aerial camera B 104b is connected to the charging station B 118b. The charging stations 118a-b may include devices to charge a battery of a connected aerial camera 104a-d. In some examples, each of the aerial cameras 104a-d may connect to a single charging station. In some implementations, each of the aerial cameras 104a-d may connect to a separate charging station.

In some examples, the charging stations 118a-b may include a cover to protect a connected aerial camera from adverse weather conditions, such as wind, rain, hail, or snow. The charging stations 118*a-b* may extend the cover over the connected aerial camera after the aerial camera connects to the charging station. The cover may be permanent and allow an aerial camera to fly under the cover and connect to the corresponding charging station. In some implementations, one or more of the charging stations 118*a-b* may be physically located within a housing, e.g., a guard house 120.

When the automated border inspection system determines that one or more conditions at the border crossing station 102 have changed, the automated border inspection system may send instructions to one or more of the aerial cameras 104*a-d* instructing the camera to move to a charging station 118*a-b*. For instance, when a battery level of a particular aerial camera is below a threshold battery level, the particular aerial camera may return to a corresponding charging station 118*a-b* and provide a message to the automated border inspection system indicating that the particular aerial camera cannot inspect a vehicle. In response, the automated border inspection system may send another aerial camera to inspect a vehicle, if one is available and conditions at the border crossing station 102 permit inspection by another camera, or generate instructions for presentation of a message that automated inspection of the vehicle is not available.

When the automated border inspection system determines that there is a high volume of traffic at the border crossing station 102, the automated border inspection system may send instructions to a greater quantity of aerial cameras than normal instructing the cameras to capture data, e.g., image or other sensors data, for vehicles at the border crossing station 102 or in an area by the border crossing station 102. For instance, when the volume of traffic at the border crossing station 102 is above a threshold value, the automated border inspection system may send two cameras to capture image data of a vehicle when only a single camera is sent when the volume of traffic is at or below the threshold value, e.g., to increase the speed at which image data is captured. In some examples, the automated border inspection system may send multiple cameras to each capture data for different vehicles in a single lane, e.g., instead of capturing data for only one vehicle in a lane at a time.

When the automated border inspection system determines that a threat level at the border crossing station 102 is high, e.g., higher than a normal threat level, the automated border inspection system may send instructions to a greater or lesser quantity of aerial cameras than normal instructing the aerial cameras to capture data. The aerial cameras may be used to increase throughput at the border crossing station 102, increase the amount of data analyzed by the automated border inspection system, or both. For instance, some or all of the cameras may be used to capture different types of data than data that is normally captured, e.g., under normal threat level conditions. When the higher threat level is because a particular type of object or a particular object may be transported through the border crossing station 102, the automated border inspection system may analyze the data to determine whether a particular vehicle may be transporting the particular object or the particular type of object. In some examples, the automated border inspection system might not send instructions to any aerial cameras depending on the threat level, e.g., when the threat level is high.

In some implementations, the automated border inspection system may use a type of threat to determine how many aerial cameras to send to inspect each vehicle or a particular vehicle or whether or not to send aerial cameras to inspect a vehicle at all. For instance, when the threat level is low, the automated border inspection system may send one aerial camera to inspect each vehicle. When the automated border inspection system determines that there is a first type of threat, the automated border inspection system may send two cameras to inspect each vehicle. When the automated border inspection system determines that there is a second type of threat, the automated border inspection system might not send any aerial cameras to inspect vehicles at the border crossing station 102.

Aerial sensors may capture other types of data in addition to image data. For instance, an aerial sensor may capture sound data and provide the sound data to the automated border inspection system. A device with aerial sensors may include microphones, thermal imagers, nuclear detectors, biological sensors, or a combination of two or more of these. In some implementations, the aerial sensors may be integrated into a device with an aerial camera. In some implementations, an aerial sensor may be included in a device that does not include an aerial camera.

The automated border inspection system may analyze the sound data to determine whether there are additional passengers in a vehicle. For example, when the automated border inspection system determines, using image data, that there is only one passenger in a vehicle, the automated border inspection system may determine, using sound data, that there may be additional passengers in the vehicle. The automated border inspection system may determine that the sound data does not indicate that the single passenger is listening to music or other audio content or on a telephone call and is likely speaking with another passenger in the vehicle. In response, the automated border inspection system may instruct an aerial camera to capture infrared image data for the vehicle to determine a likely location of another passenger, to confirm whether there is another passenger in the vehicle, or both. When the automated border inspection system determines that there is another passenger in the vehicle, the automated border inspection system may determine that the vehicle is not authorized to participate in an automated border crossing process, e.g., and may generate instructions for presentation of a message indicating that the vehicle is not able to particular in an automated border crossing process. When the automated border inspection system determines that no additional passengers are in the vehicle, the automated border inspection system may allow the vehicle, and the single passenger, to participate in an automated border crossing process, e.g., assuming all other requirements for participation in an automated border crossing process are met.

In some implementations, when an aerial camera is inspecting a vehicle, the aerial camera, or another component of the automated border inspection system, may analyze image data to determine whether the image data includes a face. If the aerial camera determines that an image depicts a face, the aerial camera may send the image data to another component of the automated border inspection system for further analysis. The other component of the automated border inspection system may determine whether the image data includes data that may be used to determine an identifier for the face, e.g., whether the face is for a person on a list of persons authorized to cross a border using an automated process.

While the aerial cameras 104*a-d* are capturing image data of a vehicle, or a passenger of the vehicle, and the vehicle is moving, the aerial cameras 104*a-d* may maintain their position with respect to the vehicle, e.g., so that captured image data is not blurry. For instance, the aerial camera may determine a velocity of the vehicle and maintain the same velocity, e.g., the same speed in the same direction as the vehicle.

In some implementations, the aerial cameras 104a-d are fully automated, e.g., capture image data without control or guidance from a user. In some implementations, one or more of the aerial cameras 104a-d are partially automated. For instance, one of the aerial cameras may move to an area adjacent to a vehicle to capture image data of a passenger in the vehicle. The automated border inspection system notifies a user that the aerial camera is in an area adjacent to the vehicle and, in response, receives one or more commands. The automated border inspection system provides the commands to the aerial camera and the aerial camera uses the commands to move and capture image data of the vehicle, the passenger, or both.

The description in this documents describes the automated border inspection system or one or more other components at the border crossing station 102, such as one of the aerial cameras 104a-d, as performing particular actions. In some implementations, a different system or combination of systems may perform those particular actions. For instance, the aerial cameras 104a-d may be part of the automated border inspection system, as described with respect to FIG. 4 below.

Figure 2:
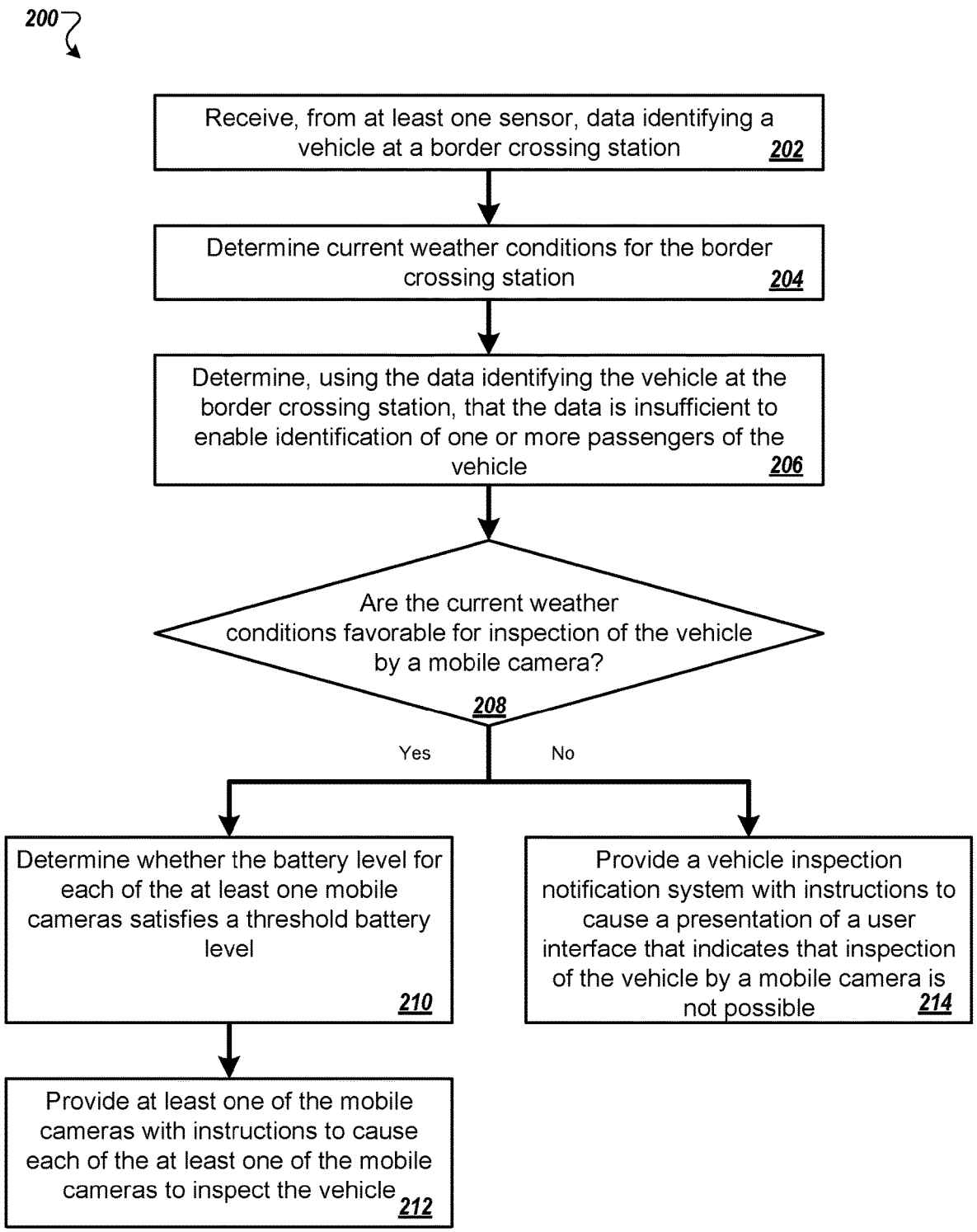
FIG. 2 is a flow diagram of a process for determining whether current weather conditions are favorable for inspection of a vehicle by a mobile camera.

FIG. 2 is a flow diagram of a process 200 for determining whether current weather conditions are favorable for inspection of a vehicle by a mobile camera. For example, the process 200 can be used by the automated border inspection system at the border crossing station 102 from the environment 100.

An automated border inspection system receives, from at least one sensor, data identifying a vehicle at a border crossing station (202). For example, a motion detector may detect a presence of a vehicle at the border crossing station and send a message to a fixed camera indicating the presence of the vehicle. The fixed camera captures image data of the vehicle and provides the image data to the automated border inspection system.

The automated border inspection system determines current weather conditions for the border crossing station (204). For instance, the automated border inspection system determines the wind speed at the border crossing station, e.g., a current maximum wind speed or a current average wind speed, the amount of ambient light or the distance between the sun and the horizon at the border crossing station, whether there is currently precipitation at the border crossing station, the temperature at the border crossing station, another weather condition, or a combination of two or more of these.

The automated border inspection system determines, using the data identifying the vehicle at the border crossing station, that the data is insufficient to enable identification of one or more passengers of the vehicle (206). The automated border inspection system determines, using the image data, that a mobile camera should capture image data of the vehicle or a passenger of the vehicle.

The automated border inspection system may determine that a size of the vehicle is greater than a threshold size and the mobile camera should capture image data of the vehicle or a passenger in the vehicle. The automated border inspection system may determine a quantity of mobile cameras to inspect a vehicle using the size of the vehicle, e.g., may send instructions to more mobile cameras for larger sized vehicles than smaller sized vehicles.

In some examples, the automated border inspection system may determine that an object shown in the image data is a vehicle and whether image data for a driver of the vehicle can be used to determine an identifier for the driver, e.g., whether the identifier is listed on an approved list. The automated border inspection system may determine whether a likelihood that a passenger is in the front passenger seat satisfies a threshold value. When the likelihood that a passenger is in the front passenger seat satisfies the threshold value and the automated border inspection system cannot use the image data to determine an identifier for the passenger, the automated border inspection system generates instructions to cause a mobile camera to capture image data for the front passenger seat of the vehicle. The automated border inspection system may repeat the process for the remaining seats in the vehicle using any appropriate method.

The automated border inspection system determines whether the current weather conditions are favorable for inspection of the vehicle by a mobile camera (208). When the current maximum wind speed or the current average wind speed is above a threshold value, the automated border inspection system determines that the weather conditions are not favorable to inspection of the vehicle by a mobile camera. When the amount of ambient light at the border crossing station satisfies a threshold amount, the automated border inspection system determines that the weather conditions are favorable to inspection of the vehicle by an aerial camera. For instance, when the automated border inspection system determines that the amount of ambient light is greater than a first threshold value, e.g., the sun is up, or less than a second threshold value, e.g., it is night time, and it is not sunrise or sunset, the automated border inspection system determines that the weather conditions are favorable to inspection of the vehicle by a mobile camera.

When the automated border inspection system determines that there is currently precipitation, at least a threshold likelihood of precipitation, or at least a threshold amount of precipitation, e.g., different thresholds for snow or rain or the same threshold, the automated border inspection system determines that the weather conditions are not favorable to inspection of the vehicle by a mobile camera. In some examples, when the automated border inspection system determines that there is currently hail or a threshold likelihood of hail, the automated border inspection system determines that the current weather conditions are not favorable to inspection of the vehicle by a mobile camera. When the automated border inspection system determines that the temperature is greater than a first threshold or less than a second threshold, the automated border inspection system determines that the weather conditions are not favorable to inspection of the vehicle by a mobile camera.

In response to determining that the current weather conditions are favorable for inspection of the vehicle by a mobile camera, the automated border inspection system determines whether the battery level for each of the at least one mobile cameras satisfies a threshold battery level (210). For instance, the automated border inspection system determines whether a particular mobile camera, e.g., assigned to a lane in which the vehicle currently is located or will be located, or any of the mobile cameras have enough power to capture data for the vehicle. In some examples, the automated border inspection system determines whether a mobile camera has enough power to capture data for multiple vehicles In response to determining that the battery level for each of the at least one mobile cameras satisfies the threshold battery level, the automated border inspection system provides at least one of the mobile cameras with instructions to cause each of the at least one of the mobile cameras to inspect the vehicle (212). For instance, the automated border inspection system provides each of the at least one mobile cameras with instructions to capture image data or other data for the vehicle. The instructions may identify the vehicle, e.g., a lane in which the vehicle is physically located. The instructions may indicate a particular portion of the vehicle for the mobile camera to analyze, e.g., the vehicle registration plate, the rear passenger's seat, or the trunk.

In response to determining that the current weather conditions are not favorable for inspection of the vehicle by a mobile camera or that the battery levels for each of the at least one mobile cameras does not satisfy the threshold battery level, the automated border inspection system provides a vehicle inspection notification system with instructions to cause a presentation of a user interface that indicates that inspection of the vehicle by a mobile camera is not possible (214). The user interface may indicate that a manual inspection of the vehicle is necessary, e.g., by a guard or another person at the border crossing station.

The order of steps in the process 200 described above is illustrative only, and a determination whether the current weather conditions are favorable for inspection of the vehicle by a mobile camera can be performed in different orders. For example, the automated border inspection system may determine the current weather conditions for the border crossing station before receiving the data identifying the vehicle at the border crossing station. The automated border inspection system may determine the current weather conditions periodically or in response to receipt of data indicating that a vehicle is physically located at the border crossing station.

In some implementations, the process 200 can include additional steps, fewer steps, or some of the steps can be divided into multiple steps. For example, the automated border inspection system may provide instructions to guide the vehicle, e.g., through in-lane variable message sign(s) such as the sign 312 described with reference to FIG. 3, based on the determination whether the current weather conditions are favorable to the inspection of the vehicle by a mobile camera, whether the battery levels for each of the at least one mobile cameras satisfies the threshold battery level, or both. For instance, when both conditions are met, the automated border inspection system may direct the vehicle to a first lane, e.g., for participation in an automated border crossing process. When one or both of the conditions are not met, the automated border inspection system may direct the vehicle to a second lane, e.g., for participation in a semi-automated or manual border crossing process.

In some examples, the automated border inspection system may determine whether a vehicle may participate in an automated border crossing process. In response to determining that the vehicle cannot participate in an automated border crossing process, e.g., determined using a vehicle plate number, the automated border inspection system may generate instructions for presentation of a user interface indicating that the vehicle cannot participate in the automated border crossing process. In response to determining that the vehicle might be able to participate in an automated border crossing process, the automated border inspection system may send instructions to a mobile camera to cause the mobile camera to inspect the vehicle, a passenger of the vehicle, or both.

In some implementations, an automated border inspection system may include cameras physically located along a road before a border crossing station. The cameras may include fixed cameras, aerial cameras, or both. The cameras may capture image data of a vehicle as the vehicle approaches the border crossing station. The automated border inspection system analyzes the image data to determine properties of the vehicle. For instance, the automated border inspection system may determine whether a person gets out of the vehicle and a different person gets into the vehicle, e.g., that was not previously in the vehicle. When a person that was not previously in the vehicle enters the vehicle, the automated border inspection system may determine that the vehicle may not participate in an automated border crossing process.

The automated border inspection system may determine whether an object is thrown out of or otherwise separates from the vehicle. For instance, the automated border inspection system may determine that a passenger in the vehicle threw an object out of the vehicle and send instructions to an aerial camera to cause the aerial camera to search for the object. In some examples, when the automated border inspection system determines that an object separates from the vehicle, the automated border inspection system determines, in response, that the vehicle may not participate in an automated border crossing process.

In some implementations, the mobile cameras may be aerial cameras, cameras affixed to vehicles with wheels or legs, or both. For instance, a single camera may have wheels and be able to fly to capture data for a vehicle. In some examples, a border control station may have some cameras that can fly, e.g., without wheels or legs, and some cameras that have wheels, e.g., that cannot fly. An automated border inspection system may determine, based on a vehicle type, vehicle location, or both, whether to send an aerial camera or a wheeled camera to inspect the vehicle. For instance, the automated border inspection system may send instructions to an aerial camera for the aerial camera to inspect a large truck and may send instructions to a wheeled camera for the wheeled camera to inspect a small car.

Figure 3A:
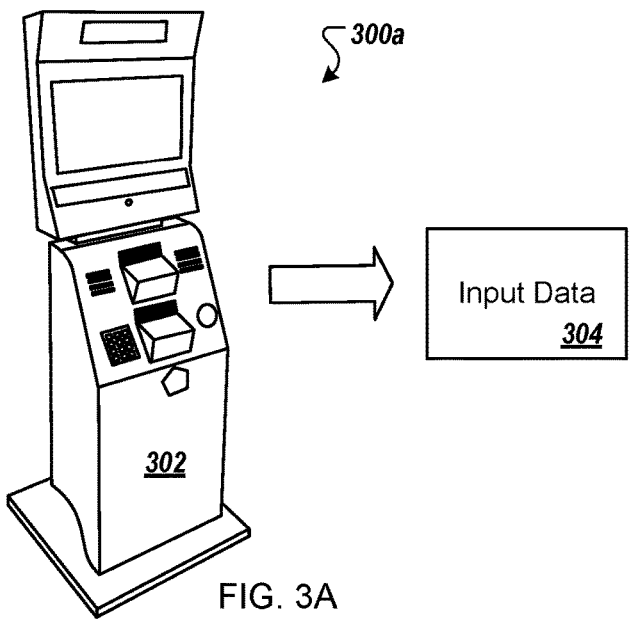
FIGS. 3A-C show examples of environments in which an automated border inspection system pre-vets passengers that are requesting to cross a border.
Figure 3B:
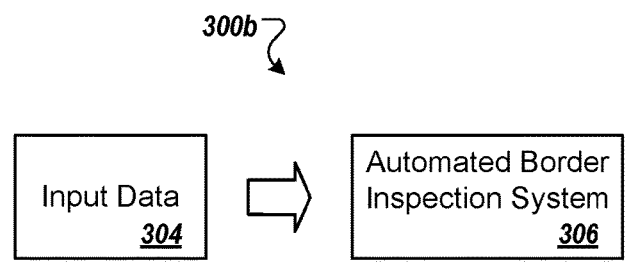
Figure 3C:
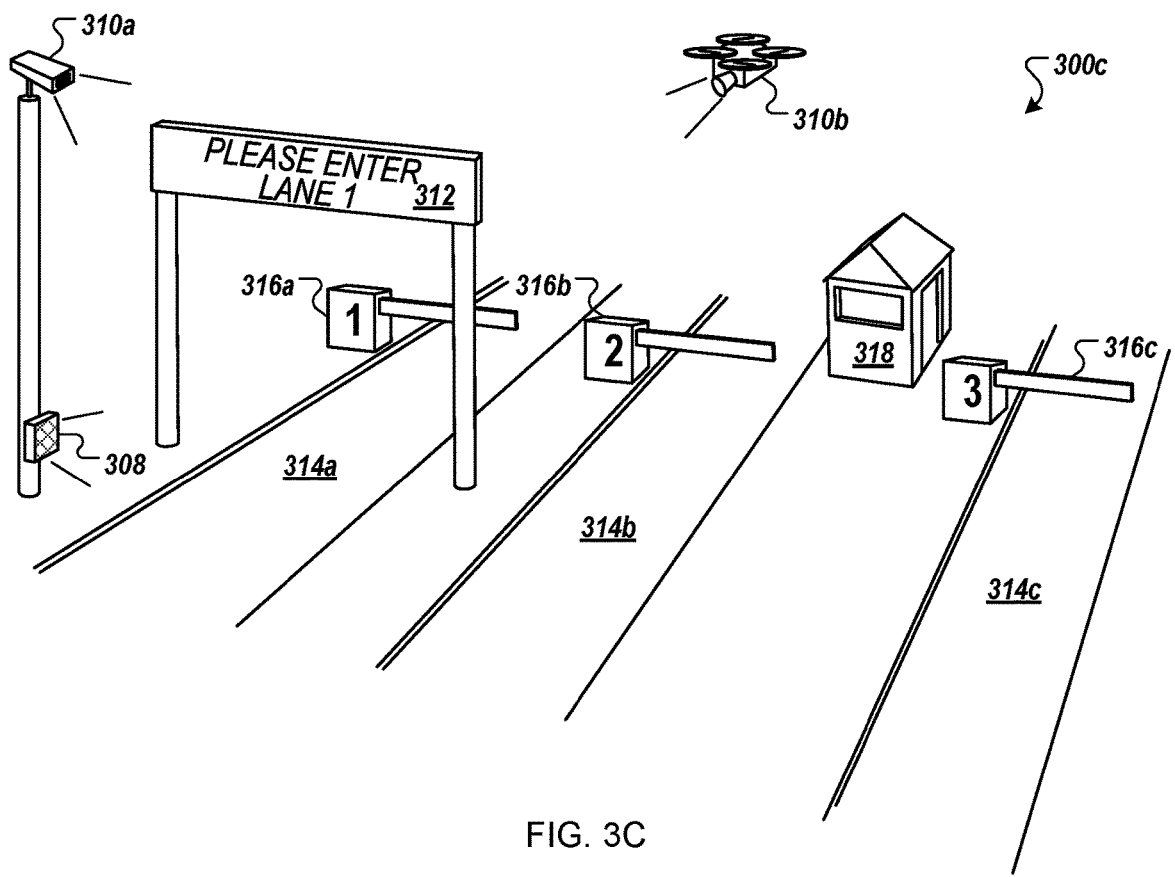

FIGS. 3A-C show examples of environments 300a-c in which an automated border inspection system pre-vets passengers that are requesting to cross a border. For example, as shown in FIG. 3A, a kiosk 302 in the environment 300a receives input data 304 during a first time period. The kiosk 302 may be physically located at a gas station, rest stop, service station, or another location at which travelers may stop, prior to arriving at a border crossing station, on their way to a destination, e.g., when the destination is in a different state or country from the physical location of the kiosk 302.

The kiosk 302 may receive input data 304 that identifies each passenger who will be in a particular vehicle crossing the border. For instance, the kiosk 302 may include one or more sensors, e.g., an image scanning sensor with ultraviolet (UV), infrared (IR), or coaxial illumination and radio frequency identification (RFID), that can be used to read, validate, or both, passport information, e.g., for each of the passengers, in response to a passenger placing a passport in front of a sensor.

The kiosk 302 may include a camera to capture an image of each of the passengers, a fingerprint scanner or an iris scanner, or two or more of these in addition to other types of biometric identification devices. In some examples, the camera may be used to determine iris information for one or more of the passengers and the kiosk 302 may include the iris information in the input data 304.

The kiosk 302 may receive passport information, visa information, or both, for one or more of the passengers, vehicle registration information, e.g., number plate or license plate information, and other types of travelling information, e.g., via scanner, keyboard, camera, or a combination of these. In some implementations, the kiosk 302 may receive an intended border crossing point from a passenger.

The kiosk 302 sends the input data 304 to an automated border inspection system 306 that analyzes the input data 304, for the particular vehicle, to pre-vet the passengers of the particular vehicle. For instance, the automated border inspection system 306 determines whether the passengers, the particular vehicle, or both, are authorized to cross the border as shown in the environment 300b of FIG. 3B. The automated border inspection system 306 may verify the authenticity of any passports, visas, or both, for the passengers and use the identification information to determine whether the passengers are allowed to travel out of the current physical region, travel to another physical region across the border, or both, as described in more detail below. The automated border inspection system 306 analyzes the input data 304 while the particular vehicle is in route to the border crossing.

In the environment 300c shown in FIG. 3C, when the particular vehicle arrives at the border crossing, a sensor 308, e.g., a motion sensor, detects the movement of the particular vehicle and causes a camera 310a or an aerial camera 310b to capture an image of the particular vehicle. The automated border inspection system 306 receives image data for the particular vehicle from the camera 310a or the aerial camera 310b and determines a vehicle identifier for the particular vehicle, e.g., a license plate number.

The automated border inspection system 306 uses the vehicle identifier to determine the whether the current passengers in the vehicle were pre-vetted for crossing the border while the particular vehicle was in route to the border crossing. For instance, when the automated border inspection system 306 determines that the current passengers in the particular vehicle are the passengers that were pre-vetted for crossing the border in the particular vehicle, the automated border inspection system 306 causes a sign 312 to display a message to a driver in the particular vehicle indicating which lane 314a-c at the border crossing the vehicle should use.

When the automated border inspection system 306 determines that the passengers and the particular vehicle are authorized to cross the border, the automated border inspection system 306 generates a message indicating that the particular vehicle should use a first lane 314a to cross the particular border. In some examples, the first lane 314a is a primary inspection lane.

The automated border inspection system 306 detects entry of the particular vehicle in the first lane and causes a first gate 316a to open to allow the particular vehicle to cross the border. After allowing the particular vehicle to pass through the first gate 316a, the automated border inspection system 306 causes the first gate 316a to close to prevent additional vehicles from crossing the border without determining whether the additional vehicles and their passengers are authorized to cross the border.

In some examples, the automated border inspection system 306 may determine that a subsequent vehicle, and its passengers, are authorized to cross the border and not close the first gate 316a. In these examples, the automated border inspection system 306 may keep the first gate 316a open until the automated border inspection system 306 detects an unauthorized vehicle or a vehicle with at least one passenger who has not been authorized or verified as authorized to cross the border, e.g., in the primary inspection lane, at which time the automated border inspection system 306 causes the first gate 316a to close to prevent the vehicle from crossing the border.

The automated border inspection system 306 may provide instructions to a device operated by a guard at the border crossing station instructing the guard to inspect the vehicle. In response, the automated border inspection system 306 may receive data from a device operated by the guard, the same device or a different device which presented the instructions to the guard, that indicates whether or not the vehicle should be allowed to cross the border. When the data indicates that the vehicle should be allowed to cross the border, the automated border inspection system 306 causes the first gate 316a to open.

When the automated border inspection system 306 is unable to determine information for one or more current passengers in a vehicle, the automated border inspection system 306 may cause the sign 312, or another sign, to present a message indicating that the vehicle should drive through a second lane 314b at the border crossing. For instance, the automated border inspection system 306 may cause the aerial camera 310b to capture images of two passengers in a vehicle and determine that there is a third passenger in the vehicle, e.g., using image data from the aerial camera 310b. The automated border inspection system 306 may compare the image data for the two passengers with image data for pre-vetted passengers and determine that the two passengers are authorized to cross the border. The automated border inspection system 306 may determine that the image data for the third person cannot be compared to image data for pre-vetted passengers, e.g., the image data is for the side or back of the third person's head, and that a guard needs to manually inspect the vehicle to determine whether the third person is authorized to cross the border.

Upon receipt of data indicating that the third person is authorized to cross the border, the automated border inspection system 306 causes a second gate 316b for the second lane 314b to open to allow the vehicle to cross the border. The second lane may be a primary inspection lane, e.g., with a guard assigned to the second lane 314b.

In some examples, the border crossing station may have roving guards that assist passengers in multiple lanes. For example, when the first lane 314a and the second lane 314b are primary inspection lanes, the automated border inspection system 306 may allow all vehicles to pass through the lanes, e.g., by opening the corresponding gates or leaving the gates open, until the automated border inspection system 306 detects a vehicle which needs further inspection, e.g., of one or more passengers or the vehicle. The automated border inspection system 306 may cause the vehicle that needs further inspection to stop at the border crossing, e.g., by having a gate for the second lane 314b to close or stay closed, and provide instructions to a device operated by a roving guard indicating that the vehicle needs further inspection, e.g., to cause the guard to go to the vehicle and verify that the passengers in the vehicle are authorized to cross the border.

In some examples, when the automated border inspection system 306 detects a vehicle that has not been pre-vetted or is not authorized or at least one passenger in a vehicle who is not authorized or not pre-vetted or cannot determine whether a particular passenger has been pre-vetted, the automated border inspection system 306 provides instructions to cause the particular vehicle to access a third lane 314c at the border crossing that is not automated. The third lane 314c may be a secondary inspection lane, e.g., located near a guard house 318.

The automated border inspection system 306 may provide instructions to a device operated by a guard, e.g., physically located in the guard house 318, to cause the guard to inspect the vehicle and the passengers in the vehicle. In response, the automated border inspection system 306 may receive input from a device operated by the guard indicating whether or not the vehicle and the passengers in the vehicle are authorized to cross the border. If the vehicle and the passengers in the vehicle are authorized to cross the border, the automated border inspection system 306 causes a third gate 316c for the third lane 314c to open to allow the vehicle to cross the particular border.

In some implementations, the third lane 314c may not allow a vehicle to cross the border. For example, the third lane 314c may provide access to an inspection area at the border crossing station to allow a guard to inspect a vehicle parked in the inspection area. When the automated border inspection system 306 receives an indication from a device operated by the guard that the vehicle and its passengers are authorized to cross the border, the automated border inspection system 306 may provide instructions to a device operated by a passenger in the vehicle to cause presentation of a user interface letting the passenger know how to cross the border, e.g., which lane to use to cross the border. The automated border inspection system 306 may cause a gate to open or remain open to allow the vehicle to use the lane to cross the border.

In some examples, when the automated border inspection system 306 determines that a particular vehicle is authorized to cross the border and is unable to verify that one of the passengers in the particular vehicle has been pre-vetted, the automated border inspection system 306 may provide instructions, e.g., to the sign 312 or a device operated by a passenger in the particular vehicle. The automated border inspection system 306 may provide instructions to a device operated by a guard indicating which passenger or passengers where not verified so that the guard verifies that those passengers are authorized to cross the border, e.g., and not the other passengers. In some examples, the automated border inspection system 306 provides instructions indicating that the guard should verify that each of the passengers is authorized to cross the border, e.g., determine that each passenger in the vehicle matches a name on a list of pre-vetted passengers for the vehicle.

In some implementations, the sign 312 may have a fixed message, e.g., that does not change, which directs vehicles that enter the border crossing station to particular lanes. For instance, the sign 312 may direct vehicles with passengers who have pre-registered at a kiosk to go to lanes 314a-b and vehicles with passengers who have not pre-registered at a kiosk to go to the third lane 314c.

In some examples, the kiosk 302 may provide a passenger with a message, e.g., on a display or on a printout, indicating a lane for the passenger's vehicle to use at a border crossing station. For instance, the message may indicate that the vehicle should use a particular lane, e.g., the second lane 314b, or may use any of a group of lanes, e.g., the lanes 314a-b. In some examples, the kiosk 402 may include a receipt printer to record encounter information for the passenger, system logging, or both. The border crossing station may include a sign, e.g., the sign 312 or another sign, indicating that vehicles that have not pre-registered should use a particular lane or a particular group of lanes, e.g., the third lane 314c.

When a vehicle arrives at the border crossing station, the automated border inspection system detects the vehicle, e.g., using the sensor 308, and determines in which lane the vehicle is located. If the vehicle is in a pre-registered lane, the automated border inspection system determines whether the passengers in the vehicle and the vehicle are pre-registered and authorized to cross the border, e.g., by capturing images of the vehicle and the passengers using the camera 310a or the aerial camera 310b. When the automated border inspection system determines that the passengers and the vehicle are authorized to cross the border, the access control system causes a gate for the lane in which the vehicle is located to open to allow only the vehicle, and no additional vehicles, to cross the border.

When the automated border inspection system determines that one of the passengers, the vehicle, or both, is not authorized to cross the border, the automated border inspection system generates instructions to cause a guard to inspect the vehicle, to direct the vehicle to a particular area, e.g., a secondary inspection area, or both. For instance, the automated border inspection system may provide instructions indicating the lane in which the vehicle is located and information about the vehicle and its passengers to a mobile device to cause a guard to manually inspect the vehicle.

In some implementations, the sign 312 may indicate, for a specific vehicle, the particular lane in which the vehicle should go. For instance, the sign 312 may present a vehicle plate number and a lane for the vehicle.

In some implementations, the automated border inspection system may dynamically allocate lanes to vehicles. For instance, the automated border inspection system may determine whether or not a vehicle is pre-registered and direct a vehicle that is not pre-registered to a particular lane. For each vehicle that is pre-registered, the automated border inspection system may determine whether the passengers in the vehicle are the pre-registered passengers for the vehicle and authorized to cross the border. If so, the automated border inspection system directs the vehicle to a lane with a shortest wait time. If one of the passengers in the vehicle is not authorized to cross the border or cross the border using an automated process, the vehicle is not authorized to cross the border, or the automated border inspection system is unable to verify that a particular current passenger pre-registered for automated crossing, the automated border inspection system may direct the vehicle to the particular lane or another lane with a longer wait time, e.g., at which a guard will manually determine whether the vehicle and the passengers may cross the border.

In some implementations, the automated border inspection system may perform an initial analysis of the passengers for a vehicle, the vehicle, or both, while the vehicle is at a physical area near the kiosk 302. The kiosk 302 may provide a passenger for the vehicle with an identifier to use to determine in which lane the vehicle should go at the border crossing station. The identifier may be a general identifier, e.g., use the letter "z" to determine which lane to access, or an identifier for a lane. While the vehicle is in route to the border crossing station, the automated border inspection system may further process information for the vehicle and the passengers to determine whether the vehicle may use an automated border crossing process, are authorized to cross the border, or both. When the automated border inspection system determines that the vehicle is at the border crossing station, the automated border inspection system may guide the vehicle to a particular lane, e.g., "vehicle with identifier z should use lane five." In some examples, the kiosk may provide the identifier to a passenger without the automated border inspection system performing an initial analysis of the vehicle, the passengers, or both.

In some implementations, all of the lanes 314a-c are primary inspection lanes. For instance, the automated border inspection system allows vehicles to enter any lane at the border crossing station. While the vehicle is waiting to arrive at the corresponding gate 316a-c for the lane, the automated border inspection system captures images of the vehicle and the passengers in the vehicle. When the automated border inspection system determines that the vehicle and the passengers in the vehicle are authorized to cross the border, e.g., for vehicles and passengers who pre-registered, the automated border inspection system causes the corresponding gate to open to allow the vehicle and its passengers to cross the border.

When the automated border inspection system determines that one or more of the passengers in a vehicle cannot be verified, e.g., the aerial camera 310b cannot capture image data for a passenger or the vehicle or one of the passengers is not pre-registered for automated crossing, the automated border inspection system may generate instructions to cause a guard to inspect the vehicle and determine whether the vehicle and its passengers are authorized to cross the border. The instructions may include information about the vehicle, the passengers in the vehicle, e.g., who were not verified, or both. In some examples, the automated border inspection system may generate instructions to cause the vehicle to go to a secondary inspection area when a passenger in the vehicle cannot be verified. For instance, the first gate 316a may include a sign that indicates that the vehicle, located in the first lane 314a, should go to a secondary inspection area physically located after the first gate 316a.

When a passenger or the vehicle is not authorized, e.g., based on a determination made by the automated border inspection system or a guard, the automated border inspection system may generate instructions to cause the vehicle to go to a secondary inspection area. For instance, the automated border inspection system may detect a vehicle that is not pre-registered and cause a guard to inspect the vehicle, e.g., by providing instructions to a device operated by the guard to cause the guard to determine whether the passengers and the vehicle are authorized to cross the border. The automated border inspection system may receive data from the device operated by the guard, or another device, indicating that further analysis of the passengers, the vehicle, or both, are required and, in response, the automated border inspection system generates the instructions to cause the vehicle to go to the secondary inspection area.

Figure 4:
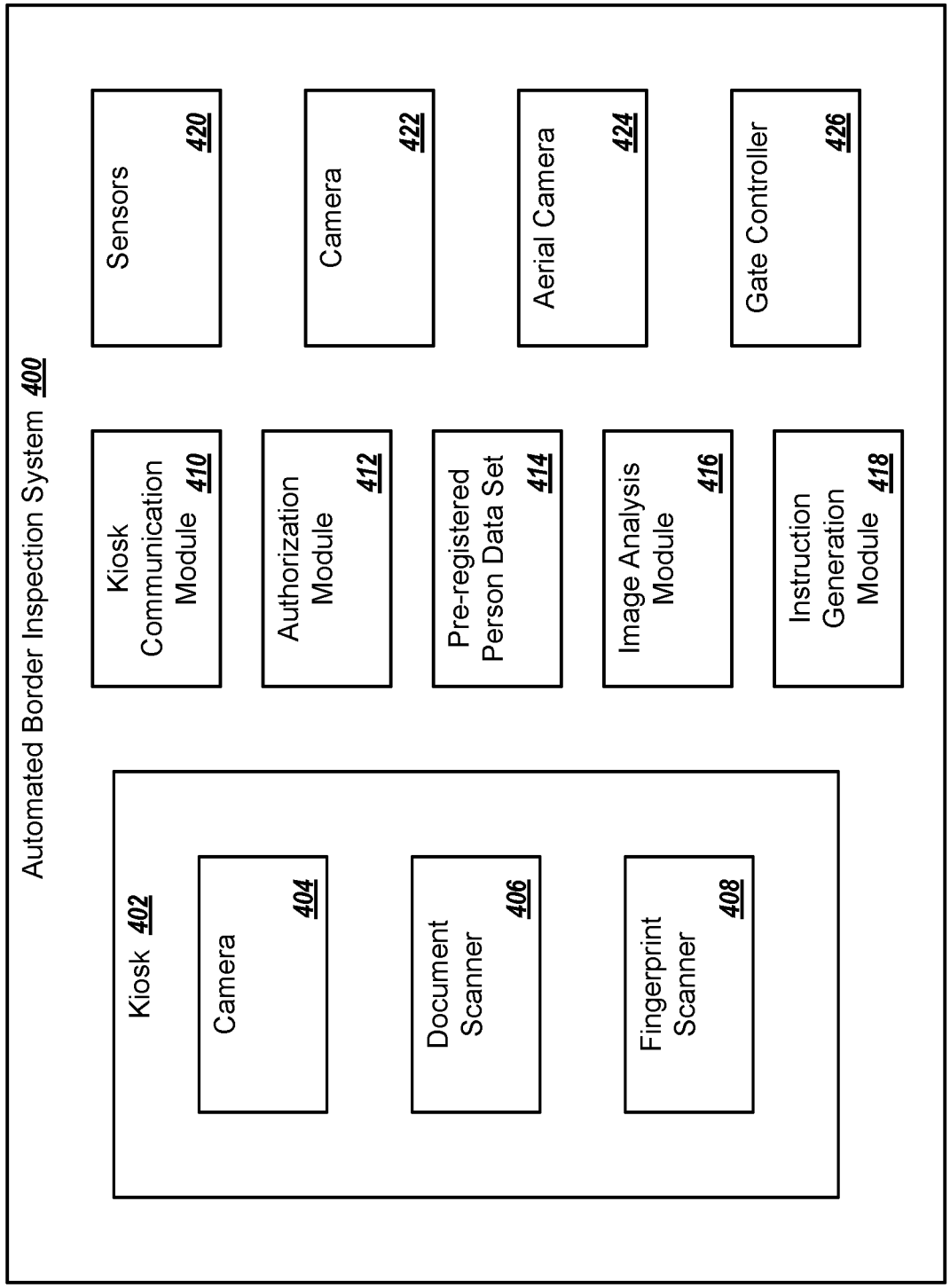
FIG. 4 is an example of an automated border inspection system.

FIG. 4 is an example of an automated border inspection system 400. The automated border inspection system 400 includes a kiosk 402. In some implementations, the automated border inspection system 400 is connected to the kiosk 402 via a network and does not include the kiosk 402. The kiosk 402, or another computer, allows a passenger of a vehicle to request authorization to cross a border before arriving at a border crossing station for the border.

The kiosk 402 may include a camera 404 that captures an image of the face of the passenger, iris information for the passenger, e.g., using an infrared camera, an image of the vehicle, an image of vehicle information, or a combination of these. For instance, the camera 404 may capture an image of the vehicle that includes a vehicle plate number, e.g., a license plate number. The vehicle information may include license plate issuer, license plate number, year, make, model, color, type, or a combination of two or more of these.

The kiosk 402 may include a document scanner 406 that allows the kiosk to scan a passenger's documents, such as a driver's license, a visa, a passport, vehicle registration information, or a combination of two or more of these. The document scanner 406 may scan images of documents and, using software installed on the kiosk 402, determine text included in the images. The document scanner 406 may scan bar codes, quick response codes, or other types of codes to determine information included in a passenger's documents. The document scanner 406 may provide images of scanned documents, images and text, only the corresponding text, or codes to the kiosk 402 for transmission to other portions of the automated border inspection system 400, e.g., as the input data.

In some examples, the kiosk may include a radio frequency identification (RFID) interface that receives traveler information, cryptographic information, or both. The kiosk 402 may receive data via the RFID interface and transmit the data to another portion of the automated border inspection system 400, e.g., as the input data. Some examples of cryptographic information may include data verifying the authenticity of a travel information, identification information, or both, e.g., a passport or border crossing information.

The kiosk 402 may include a fingerprint scanner 408, e.g., as another biometric data gathering device in addition to the camera 404. In some examples, the kiosk 402 may include additional biometric data gathering devices, e.g., a microphone. The fingerprint scanner 408 may capture fingerprint information from a passenger of a vehicle.

Any of the input devices, e.g., the camera 404, the document scanner 406, the fingerprint scanner 408 and additional data gather devices such as a keyboard, may receive data from one or more passengers for a single vehicle. For instance, the kiosk 402 may receive passport or driver's license information from a parent using the document scanner and identification information for a child from a keyboard, e.g., via input entered by the parent, and the camera 404, e.g., an image of the child's face.

In some implementations, the kiosk 402 may prompt a passenger for destination or border crossing information. For instance, the kiosk 402 may prompt a passenger to enter a name for a border crossing station at which the passenger intends to enter another region, e.g., state or country. The passenger may be the driver of the vehicle that will cross at the border crossing station or another passenger of the vehicle.

The kiosk 402 may include a submit button, either a physical button or a soft button on a display. Upon receipt of a selection of the submit button, the kiosk 402 may verify that all required information for a vehicle has been entered, e.g., the vehicle number and information for the passengers.

In some examples, the kiosk 402 may determine the required information based on a destination or border crossing and whether the required information has been received. For instance, the kiosk 402 may determine that visa information is required to enter the region to which a passenger is requesting authorization to access or a region accessed at a border station at which the passenger intends to cross. The kiosk 402 may determine whether the kiosk 402 received visa information for all of the passengers in the vehicle and, if not, request the visa information from a passenger.

Upon determining that all the required information has been received, the kiosk 402 provides the data about the vehicle and the passengers, and optionally the intended destination region or border crossing to which the vehicle is heading, to a kiosk communication module 410. The kiosk communication module 410 is at a physical location remote from a physical location of the kiosk 402. For instance, the kiosk communication module 410 is included in a server and communicates with the kiosk 402 via a network. The network may be a local area network (LAN), wide area network (WAN), the Internet, or a combination thereof.

The kiosk communication module 410 provides the data about the vehicle and the passengers, for a particular vehicle, to an authorization module 412, e.g., located in the same server or group of servers as the kiosk communication module 410. The authorization module 412 analyzes the data for the particular vehicle to determine whether the vehicle, the passengers, or both, are authorized to cross a border to access an intended destination or to cross at the identified border crossing.

For example, the authorization module 412 may access a local database, a remote database, or both, to determine whether the particular vehicle, one or more passengers of the particular vehicle, or both, are authorized to cross the border. The authorization module 412 may compare biometric data for each of the passengers, received from the kiosk, with biometric data in the database to determine if the corresponding passenger has a visa that indicates that the passenger may cross the border or go to the intended destination of the passenger. The database may include biometric data on visa applications and the authorization module 412 may determine whether the database includes an entry for the corresponding passenger and, if so, whether the database indicates that the passenger has a visa to enter the destination or cross the border.

In some examples, the authorization module 412 may use the biometric data to determine whether any of the passengers is on a watch list or identified as a person of interest, e.g., in a persons of interest database. The authorization module 412 may use a type of watch list on which a person is listed or a type of a persons of interest when determining whether to grant a passenger authorization to cross a border or access a destination. For instance, the authorization module 412 may grant a passenger who is prohibited from driving authorization to cross a border when the passenger is traveling with other passengers, e.g., because one of the other passengers is likely driving, and not grant authorization to the passenger when the passenger is traveling alone. In some examples, the authorization module 412 may authorize a person who is a government employee or an ambassador in response to determining that the person is identified on a corresponding list.

The authorization module 412 may determine whether the vehicle is listed on a watch list, e.g., is stolen, or owned by a person of interest. The authorization module 412 may query a local database, a remote database, or both, to determine whether the vehicle is listed on a watch list. In some examples, the authorization module 412 may determine whether the vehicle number plate matches the description of the vehicle, e.g., the vehicle number plate is registered for the vehicle to which the plate is attached and not another vehicle.

In some implementations, the authorization module 412 may determine whether a passport, driver's license, visa, or two or more of these, is listed on a watch list. The watch list may indicate whether the corresponding document is stolen or reported as missing. The authorization module 412 may determine whether a passport, driver's license, or visa, or two or more of these, is valid, e.g., not falsified and not expired.

In some examples, the authorization module 412 may query different databases depending on the identification information received. For instance, the authorization module 412 may query a first database to validate information in an e-passport and may query a second database and a third database to validate information in a passport, and query the third database and a fourth database to validate information in a driver's license.

The authorization module 412 may determine whether the vehicle, the passengers in the vehicle, or both, are authorized to cross a particular border. The authorization module 412 may determine whether each of the passengers in a vehicle is authorized to cross a particular border. For instance, a first group of passengers in a vehicle may be authorized to cross a first border and a second group of passengers in the vehicle may be authorized to cross a second, different border. The authorization module 412 may determine that a border request is for the first border and that the passengers in the second group, who are not in the first group, are not authorized to cross the first border.

In some examples, the authorization module 412 might not query a database to determine whether some of the passengers in a vehicle are authorized to cross a border. For instance, the authorization module 412 may determine an age of each of the passengers in a vehicle. For each of the passengers with an age that satisfies a threshold age, the authorization module 412 queries a database to determine whether the passenger is authorized to cross the border. For each of the passengers with an age that does not satisfy the threshold age, the authorization module 412 does not query a database to determine whether the passenger is authorized to cross the border. For example, the authorization module 412 may determine that these passengers are children and should be allowed to cross the border without verifying identification information, visa information, or both, for the children.

In some examples, the authorization module 412 may receive age information from the kiosk communication module 410, e.g., received by the kiosk 402 from a passenger, and validate the age information. For instance, the authorization module 412 may query a database to determine whether there is a match for a person with a particular name that is a particular age. When the authorization module 412 determines that the age for a person is accurate and that the age does not satisfy the threshold value, e.g., the person is a child, the authorization module 412 might not query additional databases for authorization information, e.g., and determine that the person is authorized to cross the border.

In some implementations, the authorization module 412 may determine whether the vehicle, the passengers in the vehicle, or both, are authorized for automated or semi-automated border crossing. For example, the authorization module 412 may determine whether the vehicle has tinted or blacked out windows, is a large van or truck with a storage area that should be inspected, or has not complied with automated or semi-automated border crossing in the past and is not allowed to participate in automated or semi-automated border crossing.

The authorization module 412 may determine that the vehicle is a passenger van or a bus and can participate in semi-automated border crossing but not fully automated border crossing. For instance, the authorization module 412 may determine that a likelihood that one or more cameras will capture images of each of the passengers in the vehicle does not satisfy a threshold value and that a guard may need to verify the identity of some of the passengers. In response, the authorization module 412 determines that the vehicle is authorized for a semi-automated border crossing.

The authorization module 412 may determine that particular types of vehicles, such as motorcycles, are good candidates for automated border crossing. The authorization module 412 may determine that these types of vehicles, and their passengers, are authorized to participate in automated border crossing assuming the passengers and the vehicle are authorized to cross the particular border.

The authorization module 412 stores the results of the authorization determination in a pre-registered person data set 414. The automated border inspection system 400, e.g., the kiosk communication module 410 or the authorization module 412, may store other information about authorized vehicles, passengers, or both, in the pre-registered person data set 414. For instance, the authorization module 412 may store biometric data for the passengers of a particular vehicle, the vehicle plate number, and whether the vehicle and passengers are authorized to cross the particular border in a record in the pre-registered person data set 414. If at least one passenger is not authorized or if the vehicle is not authorized, to cross the particular border or for participation in an automated border crossing process, the authorization module 412 may indicate in the record that the vehicle and its passengers are not authorized, e.g., one value or flag for the entire record. In some examples, the authorization module 412 may include a value or flag for each person and a value or flag for the vehicle that each indicates whether the corresponding person or vehicle is authorized to cross the border or participate in an automated or semi-automated border crossing process.

The automated border inspection system 400 includes one or more sensors 420. Some of the sensors 420 may be configured to detect entry of a vehicle at a border crossing station. The sensors 420 may include motion sensors, pressure sensors, e.g., in a road, or other types of sensors that can determine that a vehicle is at a border crossing station.

In response to detecting a vehicle at the border crossing station, the sensors 420 may activate a camera 422 or an aerial camera 424 to capture images of the passengers in the vehicle and of the vehicle number plate. The images may be visible light images, infrared images, or both. The camera that captured the images provides image data representing the images to the automated border inspection system 400, e.g., an image analysis module 416.

The image analysis module 416 uses the image data of the vehicle number plate to identify a record in the pre-registered person data set 414 for the vehicle. When the image analysis module 416 determines that the pre-registered person data set 414 does not include a record for the vehicle, e.g., the pre-registered person data set 414 does not include a record with the vehicle's plate number, the instruction generation module 418 generations instructions to guide the vehicle to a non-automated lane. For example, the instruction generation module 418 may generate instructions to guide the vehicle to a secondary inspection lane or a lane at which a guard will determine whether the vehicle and the passengers in the vehicle are authorized to cross the particular border.

When the image analysis module 416 identifies a record for the vehicle, the image analysis module 416 identifies biometric data included in the record for the pre-registered passengers of the vehicle. The image analysis module 416 analyzes the image data to determine whether the biometric data in the pre-registered person data set 414 matches the image data for the current passengers in the vehicle. The image analysis module 416 may use any appropriate method to determine whether the biometric data matches the image data for the passengers in the vehicle.

In response to determining that the biometric data matches the image data for the passengers in the vehicle, the image analysis module 416 provides information about the vehicle to an instruction generation module 418. For instance, the image analysis module 416 may provide an identifier for a record in the pre-registered person data set 414 to the instruction generation module 418.

The instruction generation module 418 uses the record in the pre-registered person data set 414 to determine whether the vehicle and its passengers are authorized for an automated border crossing process. The instruction generation module 418 may also use a result of the comparison, by the image analysis module 416, of the image data and the biometric data.

For instance, if the image analysis module 416 determines that all of the current passengers in a vehicle are represented in the biometric data for the record and the instruction generation module 418 determines that all of the passengers and the vehicle are authorized to cross the particular border, the instruction generation module 418 generates instructions to guide the vehicle through an automated border crossing lane, e.g., a primary inspection lane. The instruction generation module 418 may determine whether the passengers and the vehicle can participate in an automated or in a semi-automated border crossing process and use the result of that determination when generating instructions to guide the vehicle to a lane for crossing the border.

The instructions may be instructions that cause the presentation of a user interface on a device. The user interface presents driving instructions that indicate which lane or lanes the vehicle may use to cross the border. For instance, the instructions may cause a web browser or another application on the device to present the driving instructions. In some examples, the instructions are driving instructions that are presented on a sign at the border crossing station or on a device, e.g., the instructions are a body of a text message sent to the device.

When the automated border inspection system 400 determines that the vehicle is in the specified lane, a gate controller 426 may cause a gate to open to allow the vehicle to pass through the border station, e.g., without allowing any other vehicles to pass. In some examples, the gate controller 426 may keep the gate open until an unauthorized vehicle is detected and close the gate to prevent passage of the unauthorized vehicle through the border crossing station.

When the image analysis module 416 or the instruction generation module 418 determines that at least one of the current passengers in the vehicle cannot be identified, e.g., the aerial camera 424 cannot capture an image of the current passenger's face, or that the biometric data in the record for the vehicle does include data for a current passenger, the instruction generation module 418 may guide the vehicle to a semi-automated lane or another lane that is a secondary inspection lane. The instruction generation module 418 generations instructions to guide the vehicle to the semi-automated lane or the other lane and generates instructions to prompt a guard to inspect the vehicle and confirm the identity of the current passenger.

In some examples, when the image analysis module 416 has image data for a face of a passenger, the vehicle is pre-registered for crossing the border, and the pre-registered person data set 414 does not have biometric data for the passenger, the image analysis module 416 may send the image data to another system for further analysis. The other system may determine whether the person is included in a list of persons of interest or a watch list. The other system may be one of the systems with which the authorization module 412 communicates to determine whether pre-registered passengers are authorized to cross a border or may be the authorization module 412. If the passenger is on a list of persons of interest or a watch list, the instruction generation module 418 generates instructions to guide the vehicle to a secondary inspection lane.

In some implementations, the image analysis module 416 may analyze multiple images of each passenger. The image analysis module 416 may select a highest quality image and use the highest quality image to determine whether the corresponding passenger pre-registered with the automated border inspection system 400. The highest quality image may be selected using predetermined criteria, e.g., that indicate image features used to verify whether a passenger is authorized to cross a border.

In some examples, the image analysis module 416 may analyze each of the images of a particular passenger as part of a risk analysis process. The image analysis module 416, or another module in the automated border inspection system 400, may determine whether the behavior of the particular passenger is representative of a high risk individual who should not be allowed to participate in an automated border crossing process. In response to the image analysis module 416 determining that the particular passenger should not be allowed to participate in the automated border crossing process, the instruction generation module 418 generates instructions to guide the vehicle to a secondary inspection lane or instructions to prompt a guard to inspect a vehicle in which the particular passenger is riding or to interact with the particular passenger. For instance, the instructions may prompt the guard to determine whether the vehicle, the particular passenger and the other passengers in the vehicle are authorized to cross the border.

In some implementations, when the image analysis module 416 determines that one or more current passengers in a vehicle cannot be verified, the instruction generation module 418 may generate instructions to request a passenger of the vehicle to move the vehicle, e.g., so the camera 422 has a better angle at which to capture an image of the current passenger, to request that a passenger of the vehicle open a window of the vehicle, or to request that a passenger of the vehicle take some other action. In some examples, the instruction generation module 418 may generate instructions to cause the aerial camera 424 to capture an image of the current passenger that cannot be verified, e.g., so that the image analysis module 416 may use new image data from the image captured by the aerial camera 424 to determine whether the current passenger is authorized to cross the particular border. For instance, when the automated border inspection system 400 cannot use a first image taken by a fix camera to verify that a passenger is authorized to cross a border, the automated border inspection system 400 may cause the aerial camera 424 to capture a second image of the passenger. In some examples, the instruction generation module 418 generates instructions to guide the vehicle to a semi-automated border crossing lane at which a guard will determine whether the current passenger is authorized or instructions telling a guard to go to the vehicle and determine whether the current passenger is authorized.

In some implementations, the automated border inspection system 400 may determine a reason that the image analysis module 416 cannot verify the current passenger. For example, when there is a hardware error in the automated border inspection system 400, e.g., the camera 422 malfunctions, the instruction generation module 418 generates instructions to cause a guard to determine whether the passengers and the vehicle are authorized to cross the border. When the current passenger is preventing the capture of image data of the current passenger, the instruction generation module 418 generates instructions to cause a guard to determine whether the passengers and the vehicle are authorized to cross the border and updates a database to indicate that the current passenger is not authorized to participate in an automated border crossing process.

In some implementations, when the automated border inspection system 400 determines that a particular vehicle and group of passengers for the vehicle pre-registered for access to a border but did not show up at a border crossing station, the automated border inspection system 400 may prevent the particular vehicle, some of the passengers in the group of passengers, or both, from participating in an automated border crossing process. For instance, when the automated border inspection system 400 prevents each of the passengers in the group of passengers from participating in an automated border crossing process and one of the passengers later tries to participate in an automated border crossing process, e.g., at the kiosk 402, the authorization module 412 may prevent the participation, may determine that the passenger is not authorized to participate in an automated or semi-automated border crossing process after receipt of pre-vetting data for the passenger, or both.

In some implementations, the automated border inspection system 400 may periodically remove records from the pre-registered person data set 414. For instance, the automated border inspection system 400 may have an expiration period of time for each of the records, e.g., specific to each of the records or for all of the records. When the automated border inspection system 400 determines that the expiration period of time has passed since a group of passengers enrolled in a pre-vetting process, e.g., at the kiosk 402, and the group of passengers did not arrive at a border crossing, the automated border inspection system 400 removes a corresponding record from the pre-registered person data set 414. When the automated border inspection system 400 removes a record from the pre-registered person data set 414 and the automated border inspection system 400 later determines that the corresponding vehicle is at a border crossing station, the instruction generation module 418 generations instructions to guide the vehicle to a non-automated lane, e.g., as if the vehicle were never registered. In some examples, the automated border inspection system 400 may flag one or more people from the group of passengers as not able to participate in an automated or semi-automated border crossing process in response to determining that the expiration period of time has passed since a group of passengers enrolled in a pre-vetting process and did not arrive at a border crossing.

The automated border inspection system 400 may determine the expiration period of time using a physical of the kiosk 402, weather, traffic, information received during the registration process, or a combination of two or more of these. For instance, the automated border inspection system 400 may determine a first expiration period of time for a first kiosk five miles from a particular border station and a second, longer expiration period of time for a second kiosk thirty miles from the particular border station. In some examples, as part of the registration process, the automated border inspection system 400 may receive data indicating a time period during which the vehicle expects to be at the border crossing station, e.g., a particular day, planned vehicle stops between the physical location of the kiosk 402 and the border crossing station, or other information that the automated border inspection system 400 may use to determine the expiration period of time.

In some examples, the automated border inspection system 400 may use an intended destination of a passenger to determine a recommended border crossing station. The automated border inspection system 400 may use the physical location of the kiosk 402 to determine multiple routes to the intended destination, expected traffic at each of the border crossing stations on those routes, or both. The automated border inspection system 400 may select a preferred route from the routes and cause the kiosk 402 to present information about the preferred route. The automated border inspection system 400 may provide a list of some or all of the routes to the kiosk 402 and the kiosk 402 presents the list.

In some implementations, the automated border inspection system 400 may deny or prevent pre-registration from a particular kiosk, or device, that is outside of a threshold physical distance from a border to an intended destination of the passengers or from the intended border to which the passengers request authorization to cross. For example, when the automated border inspection system 400 receives a request for participation in a pre-vetting process from a mobile device operated by a passenger, the automated border inspection system 400 may use location information for the mobile device and determine whether the physical location of the mobile device is within the threshold physical distance from the border. If the physical location of the mobile device satisfies the threshold physical distance from the border, the automated border inspection system 400 allows the passenger to register in a pre-vetting process. If the physical location of the mobile device does not satisfy the threshold physical distance from the border, the automated border inspection system 400 prevents the passenger from registering in a pre-vetting process.

In some implementations, the automated border inspection system 400 takes an image of a vehicle and uses data from the image to determine whether the vehicle is authorized to access a particular area. For instance, the kiosk 402 may include a camera, e.g., the camera 404 or another camera, that captures an image of the vehicle. The authorization module 412 may use image data from the image to determine whether the vehicle identification information, e.g., vehicle plate number, entered by a passenger matches the vehicle represented by the image data, e.g., is registered for use on the vehicle represented by the image data. In some examples, the image analysis module 416 may analyze image data of a vehicle to determine whether the image data matches data describing a particular vehicle that is associated with a particular vehicle plate number.

Figure 5:
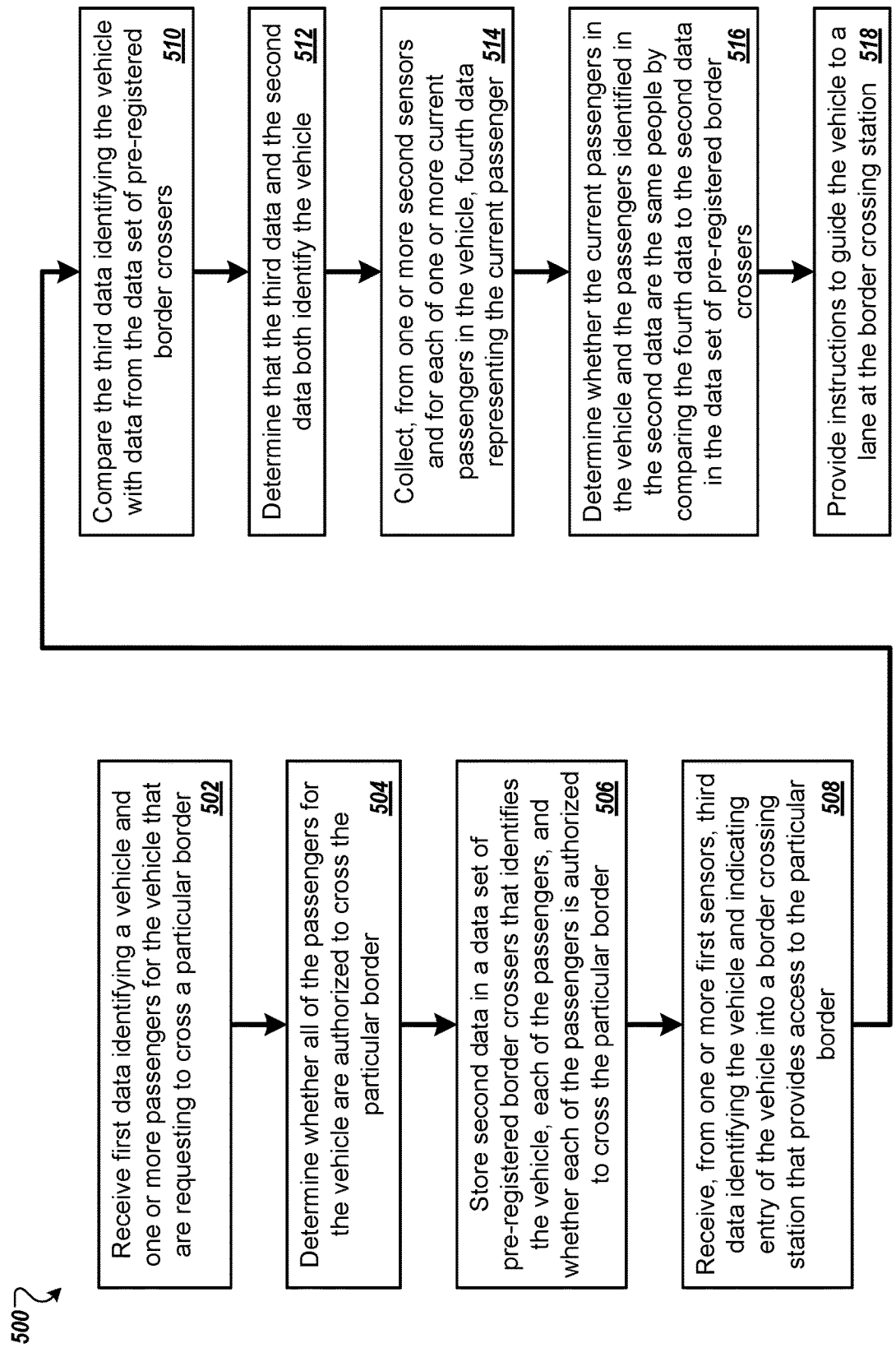
FIG. 5 is a flow diagram of a process for guiding a vehicle at a border crossing.

FIG. 5 is a flow diagram of a process 500 for guiding a vehicle at a border crossing. For example, the process 500 can be used by the automated border inspection system 400.

The automated border inspection system receives first data identifying a vehicle and one or more passengers for the vehicle that are requesting to cross a particular border (502). The first data may include biometric data, such as fingerprint information, face or iris image data, or a combination of these, for at least some of the passengers. The first data may include passport data, visa data, or both. In some examples, when the first data does not include at least some particular data, e.g., passport data or biometric data, for each of the passengers in a vehicle, e.g., based on a received number of passengers, the automated border inspection system prevents participation in a pre-vetting process. The first data for each of the vehicles may include an intended border crossing station at which the vehicle will cross, indication of the particular border, indication of a region accessed by crossing the particular border, e.g., a region to which access is requested, or a combination of two or more of these.

The automated border inspection system determines whether all of the passengers for the vehicle are authorized to cross the particular border (504). The automated border inspection system stores second data in a data set of pre-registered border crossers that identifies the vehicle, each of the passengers, and whether each of the passengers is authorized to cross the particular border (506). The second data may be a record or multiple records that together include information for each of the passengers of the vehicle and information for the vehicle, e.g., the vehicle plate number.

The automated border inspection system receives, from one or more first sensors, third data identifying the vehicle and indicating entry of the vehicle into a border crossing station that provides access to the particular border (508). The first sensors may be fixed, visible wavelength cameras. Other sensors, e.g., motion sensors, may trigger the cameras to capture images of the vehicle. A single sensor, e.g., camera, may capture data for the vehicle or multiple sensors may each capture separate data for the vehicle, e.g., separate images of the vehicle.

The automated border inspection system compares the third data identifying the vehicle with data from the data set of pre-registered border crossers (510). For instance, the automated border inspection system determines whether a vehicle plate number, identified in the third data, is in a record stored in the data set of pre-registered border crossers.

The automated border inspection system determines that the third data and the second data both identify the vehicle (512). The automated border inspection system collects, from one or more second sensors and for each of one or more current passengers in the vehicle, fourth data representing the current passenger (514). For example, one or more cameras capture images of the current passengers. A single camera may capture an image for one of the current passengers. In some examples, multiple cameras may each capture images for one of the current passengers. A single camera or multiple cameras may capture images of all of the passengers in a vehicle.

The automated border inspection system determines whether the current passengers in the vehicle and the passengers identified in the second data are the same people by comparing the fourth data to the second data in the data set of pre-registered border crossers (516). For example, the automated border inspection system may use any appropriate method to compare the image data of the current passengers with image data in the data set of pre-registered border crossers, or another database, to determine whether the current passengers are the passengers identified in the second data.

The automated border inspection system provides instructions to guide the vehicle to a lane at the border crossing station (518). For instance, the automated border inspection system determines the instructions using a result of the determination whether the current passengers are the same people as the passengers who pre-registered for the border crossing and for which the data set of pre-registered border crossers includes biometric data. The automated border inspection system may determine the instructions using information that indicates whether each of the passengers and the vehicle is authorized to cross the particular border. For example, the automated border inspection system may guide the vehicle to a first lane, e.g., a primary inspection lane, if all of the current passengers in the vehicle are authorized to cross the border. The automated border inspection system may guide the vehicle to a second lane, e.g., a secondary inspection lane, if one or more of the current passengers is not authorized to cross the border or if one or more of the pre-registered passengers, who might not be a current passenger in the vehicle, is not authorized to cross the border.

The order of steps in the process 500 described above is illustrative only, and the guidance of the vehicle at the border crossing can be performed in different orders. For example, the automated border inspection system may collect the fourth data, e.g., image data of the passengers, before or while receiving the third data, e.g., image data of the vehicle in which the passengers are travelling.

In some implementations, the process 500 can include additional steps, fewer steps, or some of the steps can be divided into multiple steps. For example, the automated border inspection system may compare the third data identifying a vehicle with the data from the data set of pre-registered border crossers, determine that an identifier for the vehicle is not included in the data set of pre-registered border crossers, and generate instructions to guide the vehicle to a particular lane, e.g., a secondary inspection lane.

Figure 6:
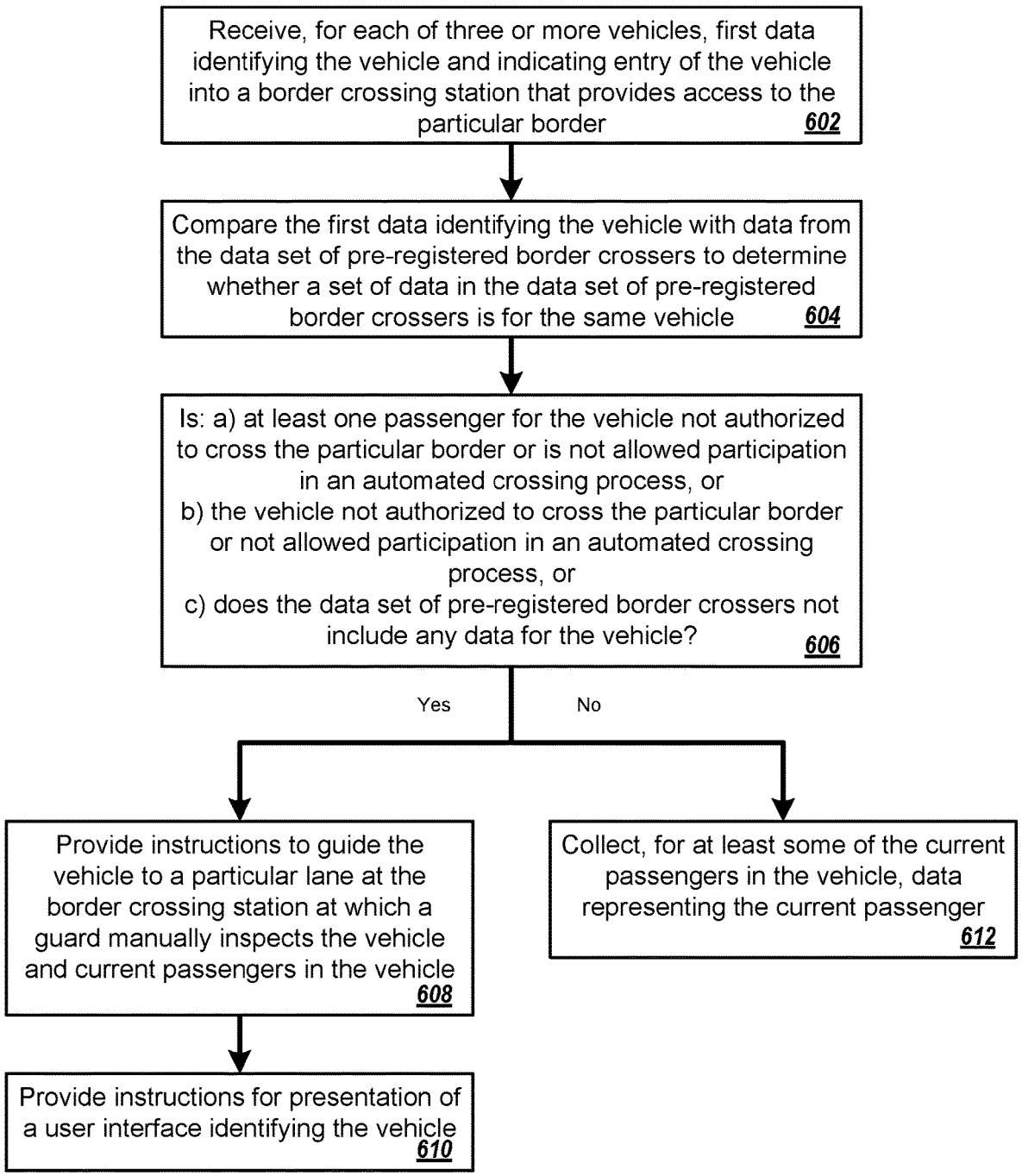
FIG. 6 is a flow diagram of a process for determining whether a vehicle and its passengers may use an automated border crossing process.

FIG. 6 is a flow diagram of a process 600 for determining whether a vehicle and its passengers may use an automated border crossing process. For example, the process 600 can be used by the automated border inspection system 400.

The automated border inspection system receives, for each of three or more vehicles, first data identifying the vehicle and indicating entry of the vehicle into a border crossing station that provides access to the particular border (602). The first data may include image data for a corresponding vehicle. For instance, the automated border crossing inspection system may perform the process 600 or part of the process 600 and the process 700 for multiple vehicles to determine a category in which the vehicle and the passengers in the vehicle belong, e.g., whether the vehicle and the passengers in the vehicle can participate in an automated border crossing process, a semi-automated border crossing process, or neither.

The three or more vehicles may be consecutive vehicles that arrive at a border crossing station. In some examples, the three vehicles are not consecutive and other vehicles arrive at the border crossing station between at least some of the three vehicles. For instance, a first vehicle may arrive at the border crossing station and the automated border inspection system determines that the first vehicle should participate in a semi-automated border crossing process. The automated border inspection system may determine that five other vehicles which may participate in a semi-automated border inspection process arrive at the border crossing station before detecting a second vehicle that can participate in a manual border crossing process and then detecting a third vehicle, without an intervening vehicle between the second and third vehicles, that can participate in an automated border crossing process.

In some implementations, the process 600 may be for each of three vehicle classifications, e.g., vehicle and passengers pre-registered and recognized, vehicle and at least some passengers pre-registered and at least one passenger not recognized, and vehicle not pre-registered. In some implementations, a system may be configured with three vehicle classifications and include instructions, that when executed, cause the system to identify vehicles, and passengers, that belong to one of the classifications.

The automated border inspection system compares the first data identifying the vehicle with data from the data set of pre-registered border crossers to determine whether a set of data in the data set of pre-registered border crossers is for the same vehicle (604). For instance, the automated border inspection system determines whether the data set of pre-registered border crossers includes a record for the vehicle.

The automated border inspection system determines whether a) at least one passenger for the vehicle is not authorized to cross the particular border or is not allowed participation in an automated crossing process, or b) the vehicle is not authorized to cross the particular border or is not allowed participation in an automated crossing process, or c) the data set of pre-registered border crossers does not include any data for the vehicle (606). In response to determining that any of the above are true, the automated border inspection system provides instructions to guide the vehicle to a particular lane at the border crossing station at which a guard manually inspects the vehicle and current passengers in the vehicle (608). In some examples, the automated border inspection system provides instructions to guide the vehicle to a lane at a border crossing station that can be used for automated border crossings and generates instructions to direct a guard to inspect the vehicle when the vehicle is in the lane.

The automated border inspection system provides instructions for presentation of a user interface identifying the vehicle (610). For example, the automated border inspection system provides the instructions to a device operated by a guard. The instructions may instruct the guard to manually inspect the vehicle and, if known, provide information about the passengers in the vehicle.

In response to determining that the pre-registered passengers and the vehicle are authorized to cross the particular border using data from the data set of pre-registered border crossers, the automated border inspection system collects, for at least some of the current passengers in the vehicle, data representing the current passenger (612). For instance, the automated border inspection system sends instructions to one or more cameras that cause the cameras to capture images of the passengers. In some examples, image data for some of the passengers may not be captured, e.g., when a passenger is laying on a seat and out of a field of view of the camera or when the passenger is an infant in a child seat.

The order of steps in the process 600 described above is illustrative only, and the determination of whether the vehicle and its passengers may use the automated border crossing process can be performed in different orders. For example, the automated border inspection system may provide instructions for presentation of the user interface identifying the vehicle, e.g., step 610, before providing instructions to guide the vehicle to the particular lane, e.g., step 608.

In some implementations, the process 600 can include additional steps, fewer steps, or some of the steps can be divided into multiple steps. For example, step 612 may include one or more of the steps from the process 700 described in more detail below.

Figure 7:
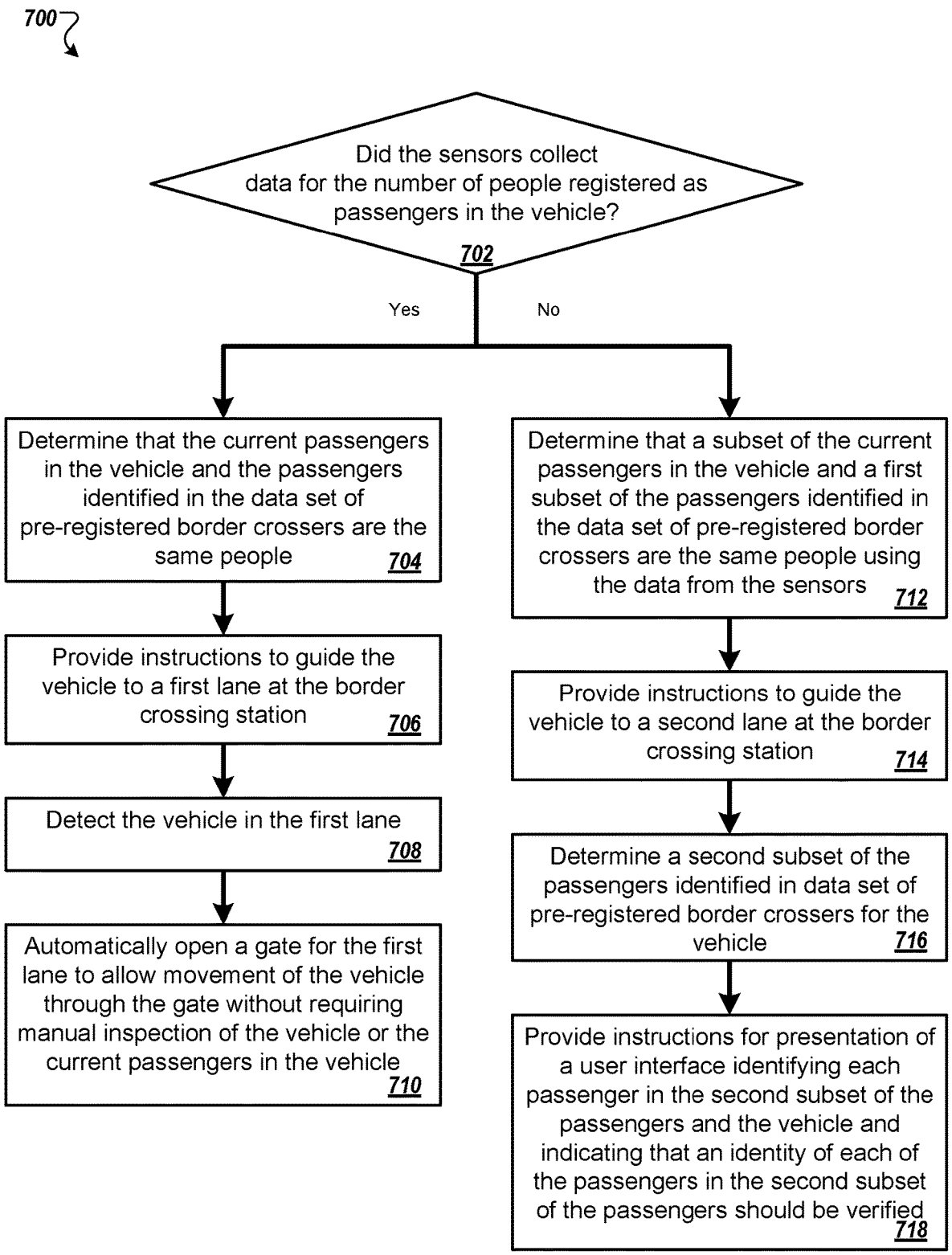
FIG. 7 is a flow diagram of a process for guiding a vehicle to a lane as part of an automated border crossing process.

FIG. 7 is a flow diagram of a process 700 for guiding a vehicle to a lane as part of an automated border crossing process. For example, the process 700 can be used by the automated border inspection system 600.

The automated border inspection system determines whether the sensors collected data for the number of people registered as passengers in the vehicle (702). For instance, the automated border inspection system determines whether the number of people pre-registered as passengers in a vehicle and the number of people shown in images captured of the vehicle is the same. In some examples, when the automated border inspection system determines that the sensors collected data for more than the number of people registered as passengers in the vehicle, and is unable to verify whether or not some of the current passengers are authorized to cross the particular border, the automated border inspection system may guide the vehicle to a manual inspection lane, e.g., perform steps 608 and 610.

In response to determining that the sensors collected data for the number of people registered as passengers in the vehicle, the automated border inspection system determines that the current passengers in the vehicle and the passengers identified in the data set of pre-registered border crossers are the same people (704). For instance, the automated border inspection system uses image data to determine that the current passengers in the vehicle and the pre-registered passengers are the same people and that the vehicle are authorized to cross the particular border.

The automated border inspection system provides instructions to guide the vehicle to a first lane at the border crossing station (706). The automated border inspection system may provide the instructions to a device operated by a passenger in the vehicle, e.g., a mobile device or the vehicle itself.

The automated border inspection system detects the vehicle in the first lane (708). For example, the automated border inspection system detects the vehicle in a primary inspection lane, e.g., the lane to which the automated border inspection system guides the vehicle.

In some examples, when the automated border inspection system detects the vehicle in a different lane than the lane or lanes to which the automated border inspection system directed the vehicle, the automated border inspection system may prompt a guard to inspect the vehicle. For instance, the automated border inspection system may prevent the vehicle from leaving the border crossing station, e.g., by not opening a gate to allow passage of the vehicle, and generate instructions for a guard to inspect the vehicle. In response to receipt of data from a device operated by the guard indicating that the passengers and the vehicle are authorized to cross the border, the automated border inspection system may allow the vehicle to cross the border, e.g., by causing a gate at the border control station to open.

The automated border inspection system automatically opens a gate for the first lane to allow movement of the vehicle through the gate without requiring manual inspection of the vehicle or the current passengers in the vehicle (710). For example, the automated border inspection system allows the vehicle to pass through the primary inspection lane. In some examples, the automated border inspection system may generate instructions for a guard indicating that the vehicle and its passengers are authorized to pass though the border crossing station without manual inspection.

In response to determining that the sensors collected data for fewer than the number of people registered as passengers in the vehicle, the automated border inspection system determines that a subset of the current passengers in the vehicle and a first subset of the passengers identified in the data set of pre-registered border crossers are the same people using the data from the sensors (712). For instance, the automated border inspection system is unable to capture image data for all of the current passengers in the vehicle or there are fewer current passengers in the vehicle than the expected number of passengers.

The automated border inspection system provides instructions to guide the vehicle to a second lane at the border crossing station (714). The second lane may be a primary inspection lane at which a guard will determine whether the vehicle and the passengers are authorized to cross the border. The second lane may be a secondary inspection lane.

The automated border inspection system determines a second subset of the passengers identified in data set of pre-registered border crossers for the vehicle (716). For example, the automated border inspection system determines for which of the pre-registered passengers the cameras were unable to capture image data, e.g., because the passengers are no longer in the vehicle or a camera was not able to capture image data for the passenger's face.

The automated border inspection system provides instructions for presentation of a user interface identifying each passenger in the second subset of the passengers and the vehicle and indicating that an identity of each of the passengers in the second subset of the passengers should be verified (718). The automated border inspection system provides the instructions to a device operated by a guard, e.g., a mobile device, a display, or another type of computer.

The guard determines whether the passengers and the vehicle are authorized to cross the border. A device operated by the guard receives data indicating the determination and provides the data, or other data representing the determination, to the automated border inspection system. In response to receipt of data indicating that the vehicle and its passengers are authorized to cross a border, the automated border inspection system may open a gate to allow the vehicle to cross the border.

The order of steps in the process 700 described above is illustrative only, and the guidance of the vehicle to the lane as part of the automated border crossing process can be performed in different orders. For example, the automated border inspection system may determine the second subset of the passengers and then provide instruction to guide the vehicle to the second lane.

In some implementations, the process 700 can include additional steps, fewer steps, or some of the steps can be divided into multiple steps. For example, when the automated border inspection system determines that there are fewer current passengers than a number of pre-registered passengers and that only pre-registered passengers are in a vehicle, the automated border inspection system may guide the vehicle to the first lane, e.g., a primary inspection lane.

In some implementations, when the automated border inspection system detects a passenger who is not pre-registered and is travelling in a vehicle that is pre-registered, the automated border inspection system may generate instructions to guide the vehicle to a semi-automated or a manual inspection lane, e.g., a secondary inspection lane.

In some implementations, the automated border inspection system does not include gates or gate controllers. In these implementations, the automated border inspection system generates instructions to cause presentation of information to a guard indicating whether or not a vehicle or some of the vehicle's passengers need to be manually authorized to cross a border.

The automated border inspection system may control access to any type of region. For instance, the border may be a border between two states or two countries. In some examples, the border may be a border for a particular building or a particular physical area that people need authorization to access.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Figure 8:
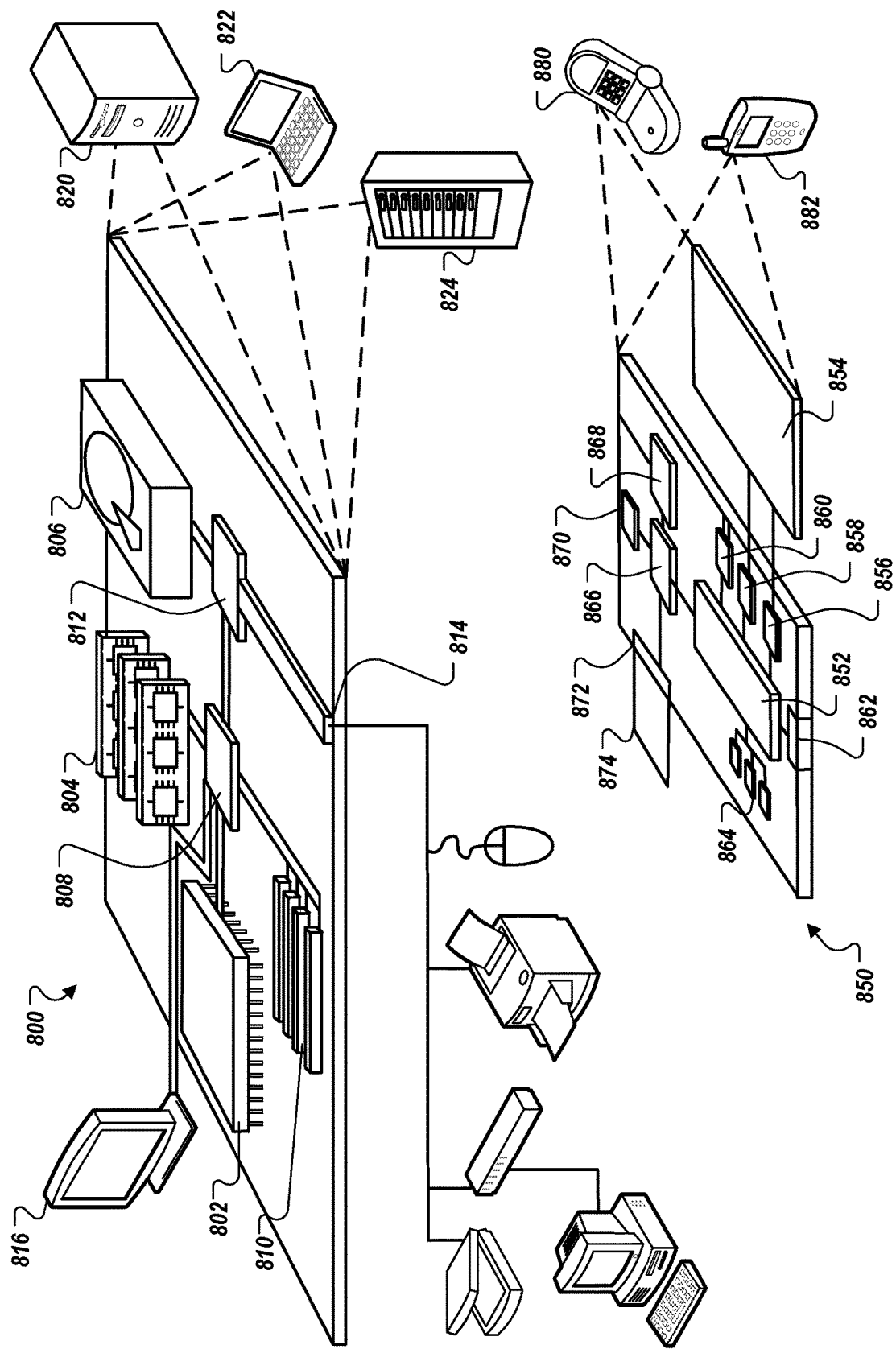
FIG. 8 is a block diagram of a computing system that can be used in connection with computer-implemented methods described in this document.

FIG. 8 is a block diagram of computing devices 800, 850 that may be used to implement the systems and methods described in this document, as either a client or as a server or plurality of servers. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a computer-readable medium. In one implementation, the memory 804 is a volatile memory unit or units. In another implementation, the memory 804 is a non-volatile memory unit or units.

The storage device 806 is capable of providing mass storage for the computing device 800. In one implementation, the storage device 806 is a computer-readable medium. In various different implementations, the storage device 806 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of duties is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 can process instructions for execution within the computing device 850, including instructions stored in the memory 864. The processor may also include separate analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD display or an OLED display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication (e.g., via a docking procedure) or for wireless communication (e.g., via Bluetooth or other such technologies).

The memory 864 stores information within the computing device 850. In one implementation, the memory 864 is a computer-readable medium. In one implementation, the memory 864 is a volatile memory unit or units. In another implementation, the memory 864 is a non-volatile memory unit or units. Expansion memory 874 may also be provided and connected to device 850 through expansion interface 872, which may include, for example, a SIMM card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA4000, or GPRS, among others. Such communication may occur, for example, through radio-frequency transceiver 868. In addition, short-range communication may occur, such as using a Bluetooth, WiFi, or other such transceiver (not shown). In addition, GPS receiver module 870 may provide additional wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A border inspection system comprising:
    a gate for controlling movement of vehicles across a border;
    one or more vehicle presence sensors that are configured to detect a presence of a vehicle at a border inspection station;
    an aerial drone platform comprising:
        one or more mobile cameras that are configured to capture images of passengers in vehicles at the border inspection station, and
        one or more processors for moving the aerial drone platform to positions in which the one or more mobile cameras are able to capture the images of the passengers;
    a data processing apparatus;
    a database storing a pre-registered data set of biometric data that is associated with pre-registered passengers; and
    a non-transitory computer readable storage medium in data communication with the data processing apparatus and storing instructions executable by the data processing apparatus and upon such execution cause the data processing apparatus to perform operations comprising:
        receiving, from at least one of the vehicle presence sensors, data indicating a presence of a vehicle at the border inspection station;
        determining current weather conditions for the border inspection station;
        determining that the current weather conditions are favorable to inspection of the vehicle by the aerial drone platform;
        in response to determining that the current weather conditions are favorable to inspection of the vehicle by the aerial drone platform, providing the aerial drone platform with instructions to cause the one or more processors of the aerial drone platform to move the aerial drone platform to a position in which the one or more mobile cameras are able to capture one or more images of each of the passengers of the vehicle;
        when the aerial drone platform is moved to the position in which the one or more mobile cameras are able to capture the one or more images of each of the passengers of the vehicle, capturing, by at least one of the mobile cameras of the aerial drone platform, the one or more images of the one or more passengers of the vehicle;
        automatically determining, based at least on comparing biometric data that is derived from the one or more images of each of the passengers of the vehicle to the pre-registered data set of biometric data that is associated with the pre-registered passengers and that is stored in the database, that each of the passengers of the vehicle is authorized to cross the border; and
        in response to automatically determining that each of the passengers of the vehicle is authorized to cross the border, transmitting instructions to cause the gate to open to allow movement of the vehicle across the border,
    wherein the gate is opened automatically to allow movement of the vehicle across the border, in response to the transmitted instructions.

2. The system of claim 1, wherein:
    determining that the current weather conditions are favorable to inspection of the vehicle by the aerial drone platform comprises determining that a wind speed is less than a threshold.

3. The system of claim 1, wherein:
    determining that the current weather conditions are favorable to inspection of the vehicle by the aerial drone platform comprises determining that a distance between the sun and a horizon as measured at the border crossing station satisfies a threshold distance.

4. The system of claim 1, wherein:
the one or more vehicle presence sensors comprise one or more fixed cameras.

5. The system of claim 1, wherein the operations comprise:
receiving data indicating a lane at the border crossing station in which the vehicle will access the border crossing station;
determining a particular mobile camera of the aerial drone platform that is assigned to the lane at the border crossing station in which the vehicle will access the border crossing station;
receiving data indicating a battery level for the particular mobile camera; and
determining whether the battery level for the particular mobile camera satisfies a threshold battery level, wherein:
providing the at least one of the mobile cameras with instructions to cause the at least one mobile camera to capture the one or more images occurs in response to a determination that the battery level for the particular mobile camera satisfies the threshold battery level.

6. The system of claim 1, comprising:
a vehicle inspection notification system,
wherein the operations comprise:
in response to determining that the current weather conditions are favorable to inspection of the vehicle by the aerial drone platform, providing the vehicle inspection notification system with instructions to cause a presentation of a user interface that indicates that inspection of the vehicle by the aerial drone platform is possible.

7. A computer-implemented method comprising:
storing, in a database, a pre-registered data setoff biometric data that is associated with pre-registered passengers;
receiving, from one or more vehicle presence sensors, data indicating a presence of a vehicle at a border inspection station;
determining current weather conditions for the border inspection station;
determining that the current weather conditions are favorable to inspection of the vehicle by an aerial drone platform that includes (i) one or more mobile cameras that are configured to capture images of passengers in vehicles at the border inspection station, and (ii) one or more processors for moving the aerial drone platform to positions in which the one or more mobile cameras are able to capture the images of the passengers;
in response to determining that the current weather conditions are favorable to inspection of the vehicle by the aerial drone platform, providing the aerial drone platform with instructions to cause the one or more processors of the aerial drone platform to move the aerial drone platform to a position in which the one or more mobile cameras are able to capture one or more images of each of the passengers of the vehicle;
when the aerial drone platform is moved to the position in which the one or more mobile cameras are able to capture the one or more images of each of the passengers of the vehicle, capturing, by at least one of the mobile cameras of the aerial drone platform, the one or more images of the one or more passengers of the vehicle;

automatically determining, based at least on comparing biometric data that is derived from the one or more images of each of the passengers of the vehicle to the pre-registered data set of biometric data that is associated with the pre-registered passengers and that is stored in the database, that each of the passengers of the vehicle is authorized to cross the border; and
in response to automatically determining that each of the passengers of the vehicle is authorized to cross the border, transmitting instructions to cause the gate to open to allow movement of the vehicle across the border,
wherein the gate is opened automatically to allow movement of the vehicle across the border, in response to the transmitted instructions.

8. The method of claim 7, wherein:
determining that the current weather conditions are favorable to inspection of the vehicle by the aerial drone platform comprises determining that a wind speed is less than a threshold.

9. The method of claim 7, wherein:
determining that the current weather conditions are favorable to inspection of the vehicle by the aerial drone platform comprises determining that a distance between the sun and a horizon as measured at the border crossing station satisfies a threshold distance.

10. The method of claim 7, wherein:
the one or more vehicle presence sensors comprise one or more fixed cameras.

11. The method of claim 7, comprising:
receiving data indicating a lane at the border crossing station in which the vehicle will access the border crossing station;
determining a particular mobile camera of the aerial drone platform that is assigned to the lane at the border crossing station in which the vehicle will access the border crossing station;
receiving data indicating a battery level for the particular mobile camera; and
determining whether the battery level for the particular mobile camera satisfies a threshold battery level, wherein:
providing the at least one of the mobile cameras with instructions to cause the at least one mobile camera to capture the one or more images occurs in response to a determination that the battery level for the particular mobile camera satisfies the threshold battery level.

12. The method of claim 7, comprising:
a vehicle inspection notification system,
wherein, in response to determining that the current weather conditions are favorable to inspection of the vehicle by the aerial drone platform, the vehicle inspection notification system is provided with instructions to cause a presentation of a user interface that indicates that inspection of the vehicle by the aerial drone platform is possible.

13. A non-transitory computer-readable medium storing software comprising instructions executable by one or more computers which, upon such execution, cause the one or more computers to perform operations comprising:
storing, in a database, a pre-registered data setoff biometric data that is associated with pre-registered passengers;
receiving, from one or more vehicle presence sensors, data indicating a presence of a vehicle at a border inspection station;

determining current weather conditions for the border inspection station;

determining that the current weather conditions are favorable to inspection of the vehicle by an aerial drone platform that includes (i) one or more mobile cameras that are configured to capture images of passengers in vehicles at the border inspection station, and (ii) one or more processors for moving the aerial drone platform to positions in which the one or more mobile cameras are able to capture the images of the passengers;

in response to determining that the current weather conditions are favorable to inspection of the vehicle by the aerial drone platform, providing the aerial drone platform with instructions to cause the one or more processors of the aerial drone platform to move the aerial drone platform to a position in which the one or more mobile cameras are able to capture one or more images of each of the passengers of the vehicle;

when the aerial drone platform is moved to the position in which the one or more mobile cameras are able to capture the one or more images of each of the passengers of the vehicle, capturing, by at least one of the mobile cameras of the aerial drone platform, the one or more images of the one or more passengers of the vehicle;

automatically determining, based at least on comparing biometric data that is derived from the one or more images of each of the passengers of the vehicle to the pre-registered data set of biometric data that is associated with the pre-registered passengers and that is stored in the database, that each of the passengers of the vehicle is authorized to cross the border; and in response to automatically determining that each of the passengers of the vehicle is authorized to cross the border, transmitting instructions to cause the gate to open to allow movement of the vehicle across the border, wherein the gate is opened automatically to allow movement of the vehicle across the border, in response to the transmitted instructions.

14. The medium of claim 13, wherein:
determining that the current weather conditions are favorable to inspection of the vehicle by the aerial drone platform comprises determining that a wind speed is less than a threshold.

15. The medium of claim 13, wherein:
determining that the current weather conditions are favorable to inspection of the vehicle by the aerial drone platform comprises determining that a distance between the sun and a horizon as measured at the border crossing station satisfies a threshold distance.

16. The medium of claim 13, wherein:
the one or more vehicle presence sensors comprise one or more fixed cameras.

17. The medium of claim 13, wherein the operations comprise:
receiving data indicating a lane at the border crossing station in which the vehicle will access the border crossing station;
determining a particular mobile camera of the aerial drone platform that is assigned to the lane at the border crossing station in which the vehicle will access the border crossing station;
receiving data indicating a battery level for the particular mobile camera; and
determining whether the battery level for the particular mobile camera satisfies a threshold battery level, wherein:
providing the at least one of the mobile cameras with instructions to cause the at least one mobile camera to capture the one or more images occurs in response to a determination that the battery level for the particular mobile camera satisfies the threshold battery level.

* * * * *

UNITED STATES PATENT AND TRADEMARK OFFICE
CERTIFICATE OF CORRECTION

PATENT NO. : 10,878,249 B2
APPLICATION NO. : 15/007422
DATED : December 29, 2020
INVENTOR(S) : Sheheryar Channah, Daniel Bachenheimer and Ajay Srinivasan Page 1 of 1

It is certified that error appears in the above-identified patent and that said Letters Patent is hereby corrected as shown below:

On the Title Page

Column 1 (Related U.S. Application Data), below "2015." insert:
-- Foreign Application Priority Data
Oct. 7, 2015 (BE) ............... 2015/5365
Jan. 20, 2016 (BE) ............... 2016/5043 --.

Signed and Sealed this
Ninth Day of March, 2021

Drew Hirshfeld
*Performing the Functions and Duties of the
Under Secretary of Commerce for Intellectual Property and
Director of the United States Patent and Trademark Office*